United States Patent
Tanaka

(10) Patent No.: US 9,226,161 B2
(45) Date of Patent: Dec. 29, 2015

(54) BASE STATION, COMMUNICATION SYSTEM, MOBILE STATION, AND COMMUNICATION METHOD

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 337 days.

(21) Appl. No.: 13/657,448

(22) Filed: Oct. 22, 2012

(65) Prior Publication Data

US 2013/0044736 A1 Feb. 21, 2013

Related U.S. Application Data

(63) Continuation of application No. PCT/JP2010/060434, filed on Jun. 21, 2010.

(30) Foreign Application Priority Data

Apr. 30, 2010 (JP) ................................. 2010/057689

(51) Int. Cl.
*H04W 16/12* (2009.01)
*H04W 16/32* (2009.01)

(52) U.S. Cl.
CPC .............. *H04W 16/12* (2013.01); *H04W 16/32* (2013.01)

(58) Field of Classification Search
CPC ............................. H04W 16/12; H04W 16/32
USPC .......................... 370/321, 322, 336, 337, 347
See application file for complete search history.

(56) References Cited

U.S. PATENT DOCUMENTS

| | | | |
|---|---|---|---|
| 8,599,952 B2* | 12/2013 | Larsson et al. ................ | 375/267 |
| 2001/0053678 A1* | 12/2001 | Bonaccorso et al. ......... | 455/137 |
| 2002/0075834 A1* | 6/2002 | Shah et al. .................... | 370/337 |
| 2005/0004897 A1 | 1/2005 | Lipson et al. | |

(Continued)

FOREIGN PATENT DOCUMENTS

| | | |
|---|---|---|
| JP | 2005-080286 | 3/2005 |
| WO | 2005/009071 | 1/2005 |
| WO | 2011/135719 | 11/2011 |

OTHER PUBLICATIONS

International preliminary report on patentability (Chapter I) issued for corresponding International Patent Application No. PCT/JP2010/060434 by the International Bureau, mailed Dec. 20, 2012.

(Continued)

*Primary Examiner* — Paul H Masur
*Assistant Examiner* — Kabir Jahangir
(74) *Attorney, Agent, or Firm* — Myers Wolin, LLC

(57) ABSTRACT

A base station includes a time-division-multiplexer that time-division-multiplexes control signals and data signals; a culling unit that culls from the signal time-division-multiplexed by the time-division-multiplexer, data signals temporally overlapping control signals of a neighboring cell; a transmitting unit that transmits the data signal culled by the culling unit; and a determining unit that determines conditions concerning the culling corresponding to transmission power of a portion temporally overlapping the control signals of the neighboring cell, in the signal transmitted by the transmitting unit. The culling unit culls the data signals based on a result obtained by the determining unit.

19 Claims, 15 Drawing Sheets

(56) References Cited

U.S. PATENT DOCUMENTS

| | | | |
|---|---|---|---|
| 2005/0020297 A1* | 1/2005 | Axness et al. | 455/552.1 |
| 2008/0186916 A1* | 8/2008 | Oshiba et al. | 370/330 |
| 2009/0252075 A1* | 10/2009 | Ji et al. | 370/312 |
| 2010/0008282 A1* | 1/2010 | Bhattad et al. | 370/312 |
| 2010/0008317 A1* | 1/2010 | Bhattad et al. | 370/329 |
| 2010/0009707 A1* | 1/2010 | Porat | 455/517 |
| 2010/0173637 A1* | 7/2010 | Damnjanovic et al. | 455/447 |
| 2010/0330916 A1* | 12/2010 | Hsieh et al. | 455/63.1 |
| 2011/0250913 A1* | 10/2011 | Vajapeyam et al. | 455/507 |
| 2011/0250919 A1* | 10/2011 | Barbieri et al. | 455/509 |
| 2011/0255431 A1* | 10/2011 | Wang et al. | 370/252 |
| 2012/0020230 A1* | 1/2012 | Chen et al. | 370/252 |
| 2012/0093096 A1* | 4/2012 | Barbieri et al. | 370/329 |

OTHER PUBLICATIONS

NTT DOCOMO; "Interference Coordination for Non-CA-based Heterogeneous Networks", 3GPP TSG RAN WG1 Meeting #60bis, R1-102307, Agenda Item: 6.8; Document for: Discussion; Beijing, China, Apr. 12-16, 2010.

* cited by examiner

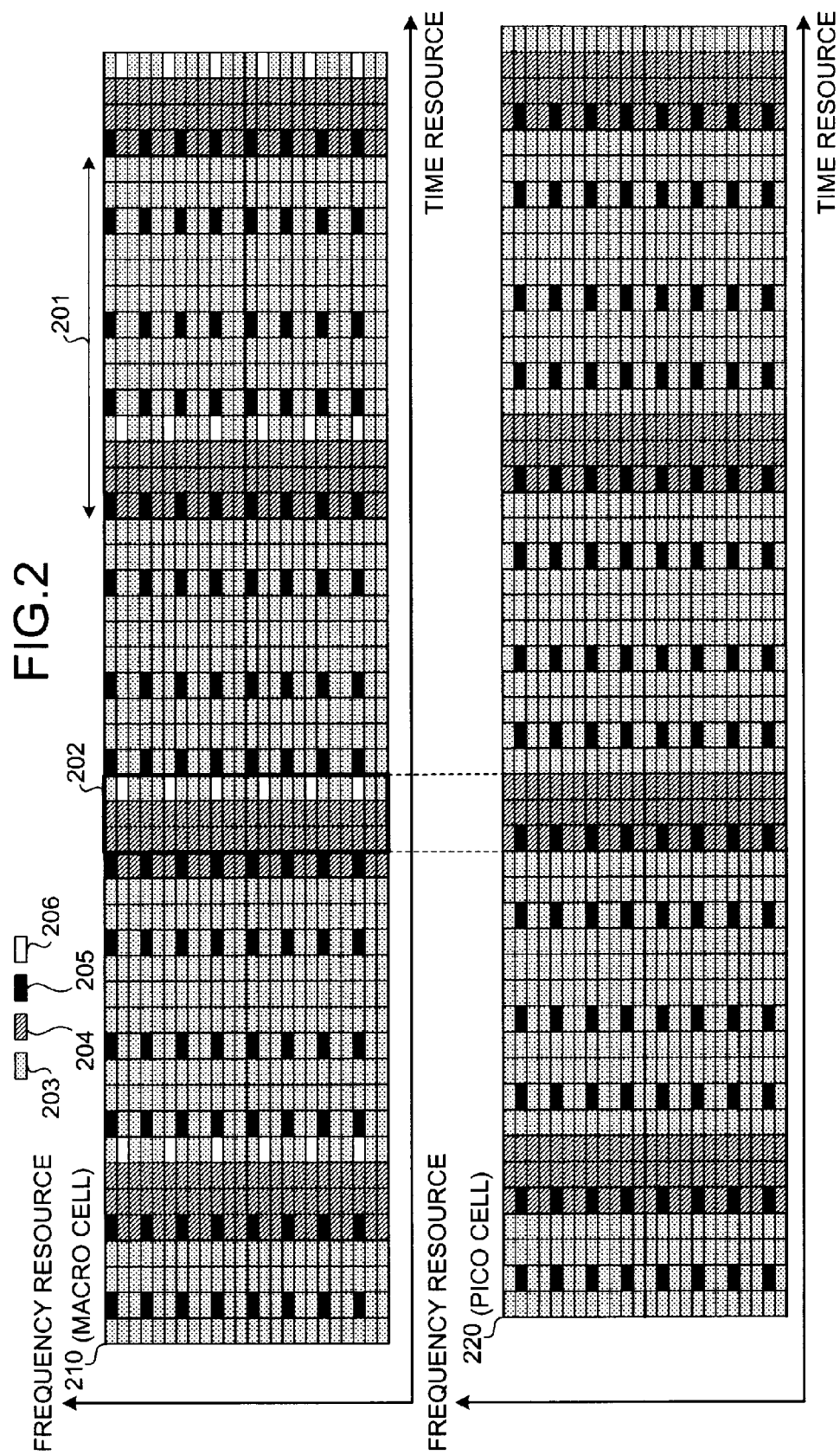

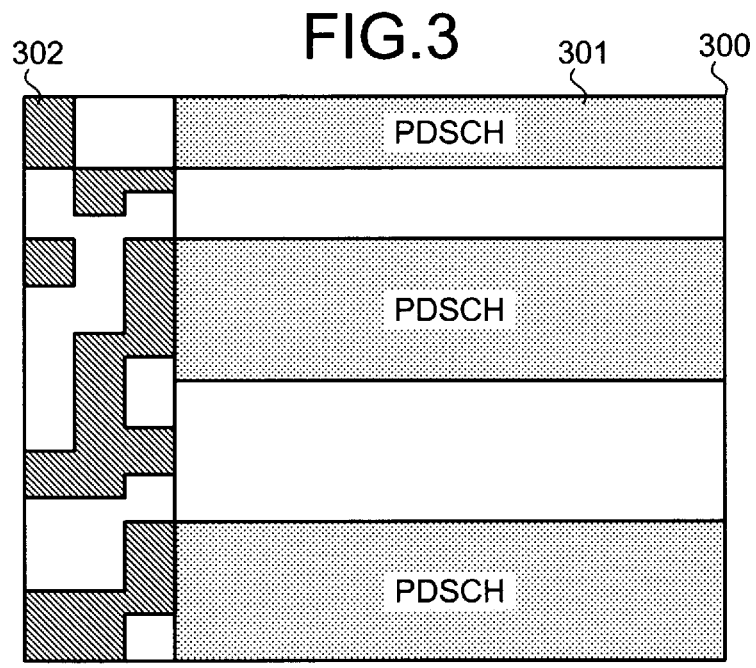
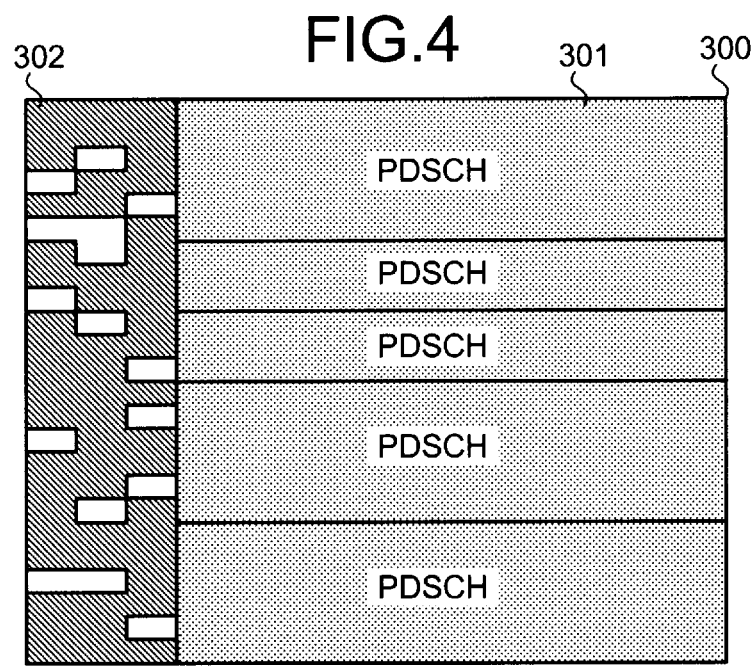

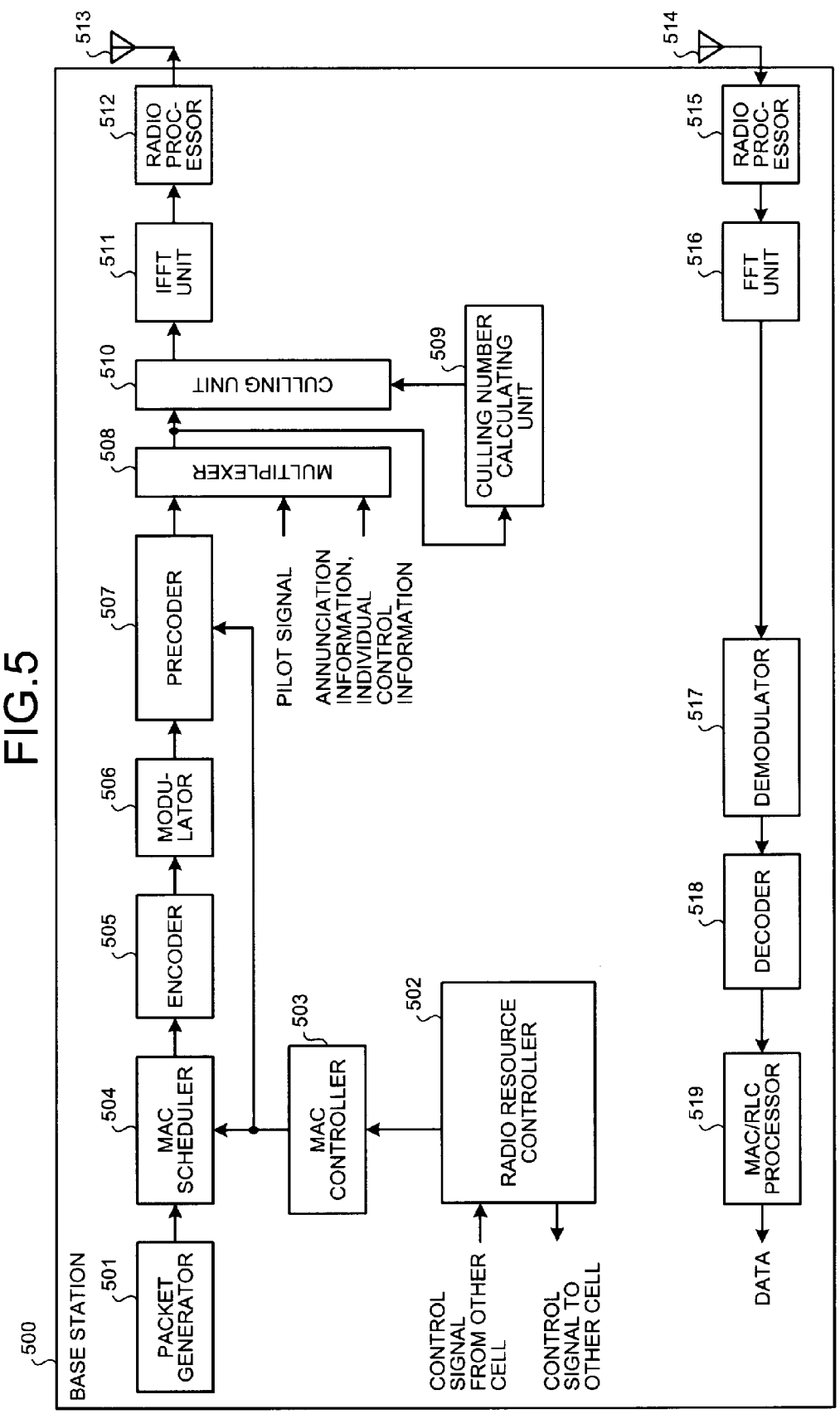

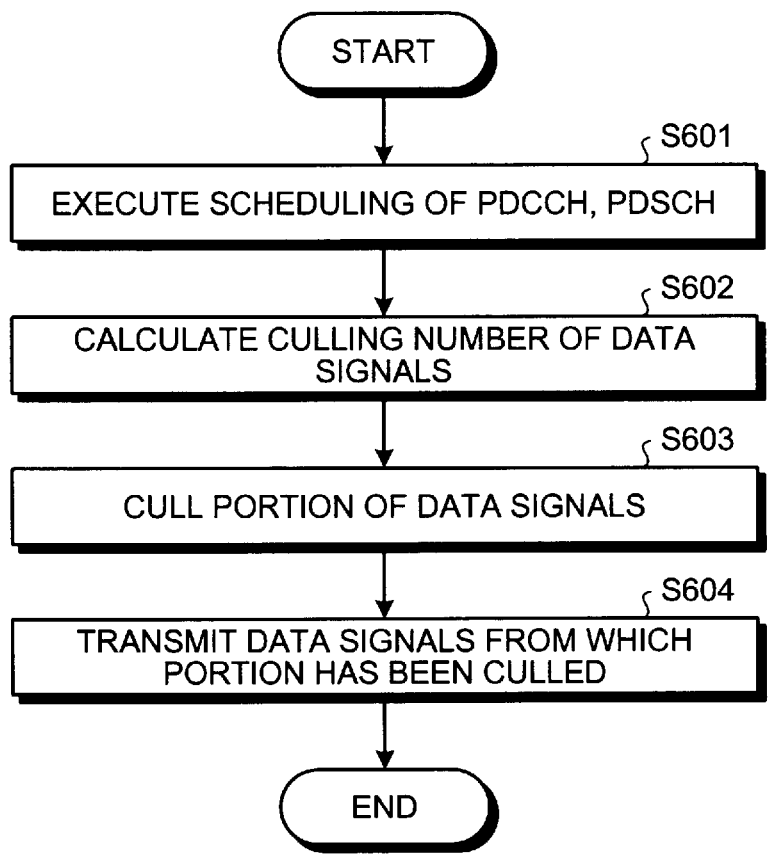

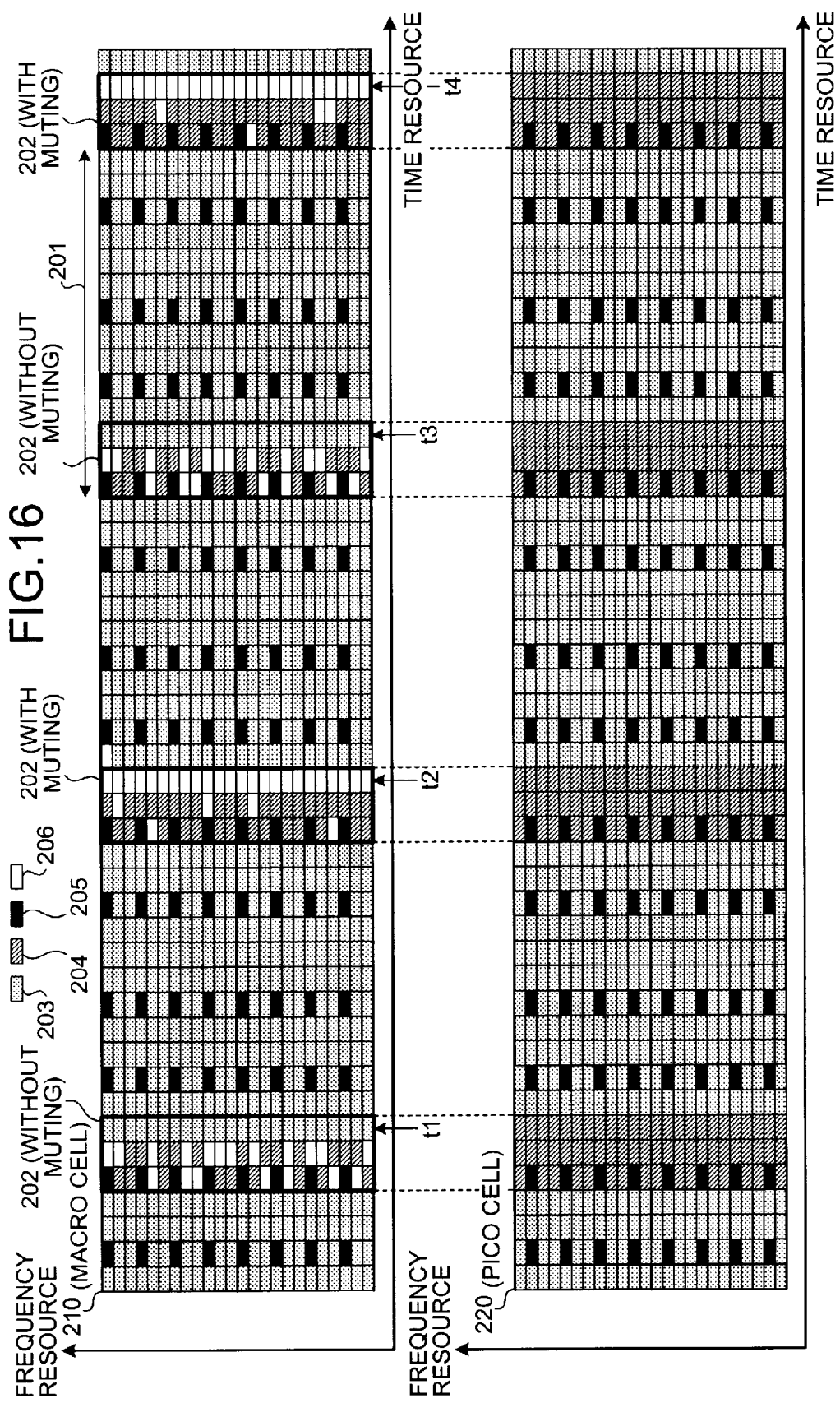

BASE STATION, COMMUNICATION SYSTEM, MOBILE STATION, AND COMMUNICATION METHOD

CROSS REFERENCE TO RELATED APPLICATIONS

This is a continuation application of International Application PCT/JP2010/060434 filed on Jun. 21, 2010 which claims priority from International Application PCT/JP2010/057689 filed on Apr. 30, 2010, the contents of which are incorporated herein by reference.

FIELD

The embodiments herein are related to a base station, a communication system, a mobile station, and a communication method that perform radio communication.

BACKGROUND

Among mobile communication systems such as portable telephone systems, cellular-based communication systems are mainstream. A cellular-based communication system combines multiple areas (cells) respectively of a communicable range of a base station to cover a wide area, and while switching communicable base stations according to the movement of a mobile station, maintains communication. Currently, although third generation mobile communication services are provided by code division multiple access (CDMA), a subsequent generation mobile communication system is under consideration that enables communication at higher speeds.

For example, long-term evolution (LTE) and LTE-advanced are under investigation in the 3rd Generation Partnership Project (3GPP). Under the LTE and LTE-advanced schemes, to improve the efficiency of frequency utilization, an operation method is assumed where communication is executed in each cell using the same frequency and a mechanism is introduced to control inter-cell interference, which is a problem associated with the operation method.

For example, in an environment where multiple cells employing different levels of transmission power such as a macro cell, a pico cell, and a femto cell (a heterogeneous network), mutual interference becomes heavy when these cells are operated using the same frequency. In particular, a mobile station located near the border of the cells is subject to heavy interference caused by a neighboring cell. Therefore, communication quality is significantly degraded.

As for the downlink, under LTE Rel. 8, a method is proposed where among the cells, notification of the maximum transmission power for each frequency is given, whereby transmission power distribution that reduces inter-cell interference is determined for the cells. By this method, inter-cell interference is reduced for data communication.

For example, under LTE, a control signal and a data signal are time-division multiplexed in each transmission slot. In a system whose cells are synchronized, the slot transmission timing of each of the cells is same and therefore, inter-cell interference occurs among control-signal multiplexed sections and among data-signal multiplexed sections. The inter-cell interference of the data signal portion can be alleviated by, for example, using a method provided in LTE Rel. 8. However, the inter-cell interference of the control signal portion cannot be reduced even by using this method.

Under 3GPP, a method has been proposed of preventing interference among the control signals by shifting sub frames of a macro cell and a pico cell by the length of the control signal section (see, e.g., "Interference Coordination for Non-CA-based Heterogeneous Networks", 3GPP, R1-102307). In "Interference Coordination for Non-CA-based Heterogeneous Networks", 3GPP, R1-102307, a method is proposed of setting a new control channel region for a pico cell in a conventional data channel region.

However, in the conventional techniques, a problem arises in that the throughput of a cell subject to interference deteriorates. For example, interference occurs between a control signal and a data signal with the method of preventing the interference among the control signals by shifting sub frames of a macro cell and a pico cell by the length of the control signal section and therefore, the throughput of the macro cell deteriorates. The interference with a pico cell control signal cannot be reduced in a sub frame for the macro cell to transmit the data signal.

With the method of setting a new control channel region for a pico cell in a conventional data channel region, the throughput of the data deteriorates because the region that can multiplex the data channel is reduced. Because a new channel is defined, another problem also arises in that the backward compatibility is lost.

SUMMARY

According to an aspect of an embodiment, a base station includes a time-division-multiplexer that time-division-multiplexes control signals and data signals; a culling unit that culls from the signal time-division-multiplexed by the time-division-multiplexer, data signals temporally overlapping control signals of a neighboring cell; a transmitting unit that transmits the data signal culled by the culling unit; and a determining unit that determines conditions concerning the culling corresponding to transmission power of a portion temporally overlapping the control signals of the neighboring cell, in the signal transmitted by the transmitting unit. The culling unit culls the data signals based on a result obtained by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram of examples of transmission signal systems according to the first embodiment;

FIG. 3 is a diagram of radio resources whose utilization rates are relatively low;

FIG. 4 is a diagram of radio resources whose utilization rates are relatively high;

FIG. 5 is a diagram of an example of a configuration of a base station;

FIG. 6 is a flowchart of an example of operation of the base station;

FIG. 16 is a diagram of an example of a transmission signal system according to a fifth embodiment.

DESCRIPTION OF EMBODIMENTS

Preferred embodiments of the disclosed technology are described in detail with reference to the accompanying drawings.

Figure 1:
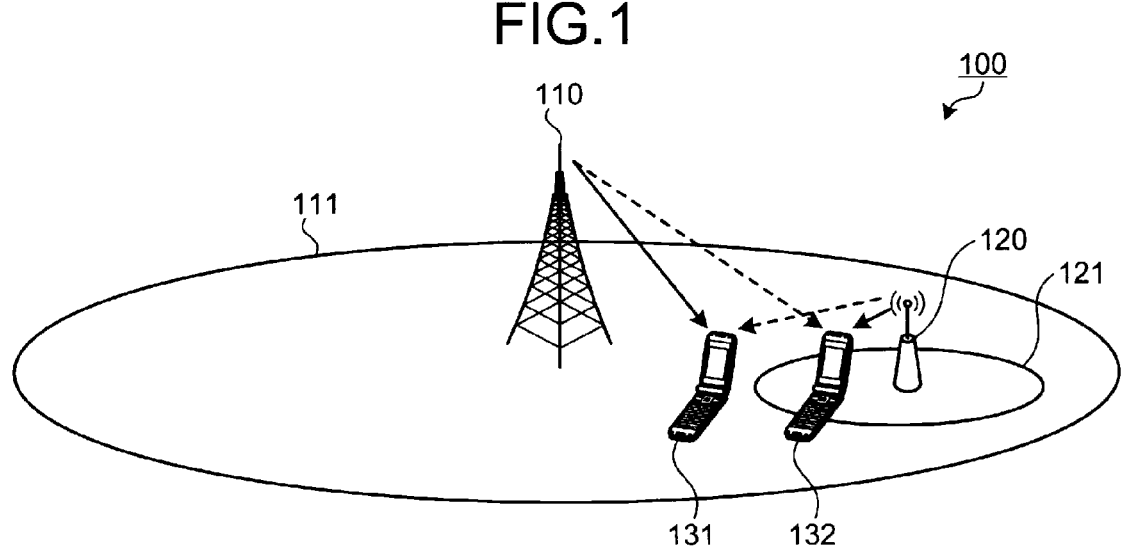
FIG. 1 is a diagram of an example of a configuration of a communication system according to a first embodiment.

FIG. 1 is a diagram of an example of a configuration of a communication system according to a first embodiment. As depicted in FIG. 1, the communication system 100 according to the first embodiment includes base stations 110 and 120, and mobile stations 131 and 132. The communication system 100 is a heterogeneous network that is operated having multiple cells of differing transmission powers. The base station 110 is a base station that forms a macro cell 111. The base station 120 is a base station that forms a pico cell 121. The macro cell 111 and the pico cell 121 are cells whose communication areas entirely or partially overlap with each other (neighboring cells). In the example depicted in FIG. 1, the pico cell 121 is included in the macro cell 111.

The mobile station 131 is located within the coverage of the macro cell 111 and executes communication with the base station 110. The mobile station 131 is located within the vicinity of the pico cell 121 and therefore, is subject to interference from the base station 120. The mobile station 132 is located within the coverage area of the pico cell 121 and communicates with the base station 120. The mobile station 132 is also located within the coverage area of the macro cell 111 and therefore, is subject to interference from the base station 110. In the description below, a case will be described where interference from the base station 110 to the mobile station 132 is reduced.

FIG. 2 is a diagram of examples of transmission signal systems according to the first embodiment. A transmission signal is formed by consecutive frames and each of the frames is formed by multiple sub frames. The transmission signal system 210 depicted in FIG. 2 is a transmission signal system transmitted from the base station 110 in the macro cell 111. The transmission signal system 220 is a transmission signal system transmitted from the base station 120 in the pico cell 121. A time period 201 represents the length of a sub frame in the transmission signal systems 210 and 220 (in this case, 14 symbols).

For the transmission signal systems 210 and 220, the axis of abscissa represents the time resource; the axis of ordinate represents the frequency resource; resource elements 203 each represent a resource element to which a data signal is allocated; resource elements 204 each represent a resource element to which a control signal is allocated; resource elements 205 each represent a resource element to which a reference signal is allocated; and resource elements 206 each represent a resource element to which a null signal is allocated.

As depicted for the transmission signal systems 210 and 220, each of the base stations 110 and 120: allocates the control signal to a time period that corresponds to three symbols in the sub frame; allocates the data signals to a time period that corresponds to 11 symbols; allocates the reference signal to the sub frame distributing the reference signal therein.

As depicted for the transmission signal systems 210 and 220, the base station 110 shifts by one symbol, the transmission timing of the transmission signal system 210 with respect to the transmission signal system 220 of the base station 120. Thereby, the control signals of the transmission signal systems 210 and 220 overlap with each other for an amount corresponding to two symbols. In this manner, the base station 110 time-division-multiplexes the control signals and the data signals such that the time period to which the control signals is allocated is partially shifted with respect to that of the neighboring cell (the pico cell 121).

For each resource element of the transmission signal system 210, a resource element group 202 represents a portion that temporally overlaps with the control signal of the transmission signal system 220. Transmission power P of the resource element group 202 can be expressed by equation (1) below.

$$P = P0 \cdot N0 + P1 \cdot N1 + P2 \cdot N2 + P3 \cdot N3 + \sum_{k=1}^{K} Pdk \cdot Ndk \quad (1)$$

In equation (1), "K" denotes the number of PDSCHs allocated to the resource element group 202 (the number of users). "P0", "P1", "P2", and "P3" respectively are EPRE of each of the reference signal, PCFICH, PHICH, and PDCCH. "EPRE (Energy Per Resource Element)" is the transmission power of each resource element. "Pdk" is EPRE of PDSCH of a user "k".

"N0", "N1", "N2", and "N3" respectively are numbers of resource elements of the reference signal, PCFICH, PHICH, and PDCCH in the resource element group 202. "Ndk" is number of resource elements of PDSCH allocated to the user k in the resource element group 202.

The numbers of resource elements of the reference signal and PCFICH, "N0" and "N1" are, for example, fixed numbers in each sub frame. The numbers of resource elements of PHICH, PDCCH, and PDSCH, "N2", "N3", and "Ndk" are each, for example, a different number for each sub frame. Therefore, the transmission power P of the resource element group 202 is different for each sub frame and the power of the interference to the mobile station 132 located within the coverage of the pico cell 121 is varied corresponding to the transmission power P.

The base station 110 culls a portion of the data signals in the resource element group 202 (puncturing). The resource element 206 of the transmission signal system 210 represents a resource element from which a data signal is removed by the culling and to which the null signal is allocated. The transmission power of the resource element 206 is zero. When Npck resource elements of PDSCH allocated to the user k are culled, the number of resource elements of PDSCH is Ndk-Npck after the culling. Therefore, the transmission power of the resource element group 202 after the culling can be expressed by equation (2) below.

$$P = P0 \cdot N0 + P1 \cdot N1 + P2 \cdot N2 + P3 \cdot N3 + \sum_{k=1}^{K} Pdk(Ndk - Npck) \quad (2)$$

The base station 110 calculates the culling number for the transmission power P in equation (2) to be equal to or smaller than a threshold value Pth, and culls for the number calculated, the data signals in the resource element group 202 in resource elements. The culling number may be same for all users or may be determined for each of the users based on a margin for the necessary quality of the user.

The threshold value Pth is determined in advance based on the magnitude of the influence of the interference to the cell subject to interference. For example, the level of the interference from the base station 110 is measured by the base station 132 in the pico cell 121, which is the cell subject to interference, and the measurement result is transmitted to the base station 110. The base station 110 determines the threshold value Pth based on the measurement result transmitted. When the culling number for specific user data is large, the encoding rate of the user data signal may be set to be low. Thereby, deterioration of the error resilience can be suppressed even when the encoding rate is substantially increased by the culling.

FIG. 3 is a diagram of radio resources whose utilization rates are relatively low. FIG. 4 is a diagram of radio resources whose utilization rates are relatively high. A radio resource 300 depicted in FIGS. 3 and 4 represents a radio resource in one sub frame to which the data signals and the control signals are allocated by the base station 110. A region 301 of the radio resource 300 represents a region to which the data signal (for example, PDSCH) is allocated. A region 302 of the radio resource 300 represents a region to which the control signal (for example, PDCCH) is allocated.

The null signal is allocated to each of the portions to which neither the data signal nor the control signal is allocated in the radio resource 300 (portions other than the regions 301 and 302). The transmission power is zero for the portions to which the null signals are allocated in the radio resource 300.

The utilization rate of the radio resource 300 depicted in FIG. 3 is relatively low by the data signals and therefore, the utilization rate thereof by the control signals is also relatively low. Therefore, the transmission power of the resource element group 202 is relatively low. The utilization rate of the radio resource 300 depicted in FIG. 4 is relatively high by the data signals and therefore, the utilization rate thereof by the control signals is also relatively high. Therefore, the transmission power of the resource element group 202 is relatively high.

As depicted in, for example, FIG. 4, even when the utilization rate of the radio resource 300 is relatively high, the base station 110 is able to reduce the transmission power in the region 301 by culling a portion of the data signals. Thereby, the average transmission power of the resource element group 202 can be reduced and the interference can be reduced to the control signal in the pico cell 121.

FIG. 5 is a diagram of an example of a configuration of a base station. The base station 500 depicted in FIG. 5 is a base station that is applied to, for example, the base station 110 depicted in FIG. 1. The base station 500 includes a packet generator 501, a radio resource controller 502, an MAC controller 503, an MAC scheduler 504, an encoder 505, a modulator 506, a precoder 507, a multiplexer 508, a culling number calculating unit 509, a culling unit 510, an IFFT unit 511, a radio processor 512, a transmitting antenna 513, a receiving antenna 514, a radio processor 515, an FFT unit 516, a demodulator 517, a decoder 518, and an MAC/RLC processor 519.

The packet generator 501 generates packets to be transmitted to the mobile station 131, and outputs the generated packets to the MAC scheduler 504. The radio resource controller 502 receives a control signal from another cell and controls the radio resource based on the received control signal. For example, the radio resource controller 502 outputs the control signal to the MAC controller 503 and transmits the control signal to another cell and thereby, controls the radio resource. The control of the radio resource includes, for example, handing over and synchronized communication control. The radio resource controller 502 may receive the measurement result of the level of the interference that is from the base station 110 and in the neighboring cell (the pico cell 121).

The MAC controller 503 controls an MAC layer based on the control signal output from the radio resource controller 502. For example, the MAC controller 503 outputs the control signal to the MAC scheduler 504 and the precoder 507 and thereby, controls the MAC layer. The control signal output by the MAC controller 503 includes, for example, a setting value of the transmission power and parameters for pre-coding control.

The MAC scheduler 504 executes based on the control signal output from the MAC controller 503, scheduling in the MAC layer of the packets output from the packet generator 501. The MAC scheduler 504 outputs the packets to the encoder 505 corresponding to the result of the scheduling in the MAC layer. The encoder 505 encodes the packets output from the MAC scheduler 504 and outputs the encoded packets to the modulator 506.

The modulator 506 modulates the packets output from the encoder 505 and outputs the modulated packets to the precoder 507. The precoder 507 executes pre-coding for the packets output from the modulator 506 based on the control signal output from the MAC controller 503, and outputs the pre-coded packets to the multiplexer 508.

The multiplexer 508 receives input of the packets output from the precoder 507 and control signals such as the pilot signal (reference signal), annunciation information, and individual control information. The multiplexer 508 multiplexes the input packets (data signals) and control signals based on, for example, the result of the scheduling by the MAC scheduler 504. For example, the multiplexer 508 time-division-multiplexes the control signals and the data signals such that the time period to which the control signals are allocated is partially shifted with respect to that of the neighboring cell (the pico cell 121), and outputs the multiplexed signal to the culling number calculating unit 509 and the culling unit 510.

The culling number calculating unit 509 calculates the number of resource elements to be culled in the puncturing (the culling number). For example, the culling number calculating unit 509 calculates the largest culling number with which the transmission power P of equation (2) is equal to or smaller than the threshold value Pth. For example, the culling number calculating unit 509 calculates the culling number based on the signal output from the multiplexer 508, or may acquire from, for example, the MAC scheduler 504, information such as the number of users K; N2, N3, and Ndk, which are the number of resource elements of PHICH, PDCCH, and PDSCH, and may calculate the culling number based on the acquired information.

The culling number calculating unit 509 may acquire from the radio resource controller 502 the measurement result of the level of the interference that is from the base station 110 and in the neighboring cell (the pico cell 121) and may determine the threshold value Pth based on the measurement result acquired. The culling number calculating unit 509 outputs the determined culling number to the culling unit 510.

The culling unit 510 culls the signal output from the multiplexer 508 for the number corresponding to the culling number output from the culling number calculating unit 509.

For example, the culling unit 510 culls a portion of the data signals in the resource element group 202. The culling unit 510 outputs the signal remaining after the culling to the IFFT unit 511.

The IFFT unit 511 (Inverse Fast Fourier Transform) inverse-Fourier-transforms the signal output from the culling unit 510 and outputs the inverse-Fourier-transformed signal to the radio processor 512. The radio processor 512 executes radio processing for the signal output from the IFFT unit 511 and outputs the radio-processed signal to the transmitting antenna 513. The transmitting antenna 513 transmits by radio and to the mobile station 131, the signal output from the radio processor 512.

The receiving antenna 514 receives a signal transmitted by radio from, for example, the mobile station 131 and outputs the received signal to the radio processor 515. The radio processor 515 executes radio processing for the signal output from the receiving antenna 514 and outputs the radio-processed signal to the FFT unit 516. The FFT unit 516 (Fast Fourier Transform) Fourier-transforms the signal output from the radio processor 515 and outputs the Fourier-transformed signal to the demodulator 517. The demodulator 517 demodulates the signal output from the FFT unit 516 and outputs the demodulated signal to the decoder 518.

The decoder 518 decodes the signal output from the demodulator 517 and outputs the decoded signal to the MAC/RLC processor 519. The MAC/RLC processor 519 executes processing for the signal output from the decoder 518 in the MAC layer and that in the RLC layer, and outputs the data acquired by the processing in the MAC layer and that in the RLC layer.

FIG. 6 is a flowchart of an example of operation of the base station. The base station 110 executes steps depicted in, for example, FIG. 6. The base station 110 first executes scheduling of PDCCH and PDSCH for the sub frame (step S601). At step S601, PDCCH and PDSCH are allocated such that the time period to which PDCCH is allocated is partially shifted with respect to that of the neighboring cell (the pico cell 121).

The base station 110 calculates the culling number of the data signals of a sub frame "i" based on the result of the scheduling at step S601 (step S602). The base station 110 culls a portion of the data signals in the resource element group 202 of the sub frame i for the number corresponding to the culling number calculated at step S602 (step S603). The base station 110 transmits the data signals from which a portion has been culled at step S603 (step S604) and the series of process steps for the sub frame i comes to an end. The base station 110 transitions to processing for the sub frame (i=i+1) subsequent to the sub frame i and transitions to step S601.

Figure 7:
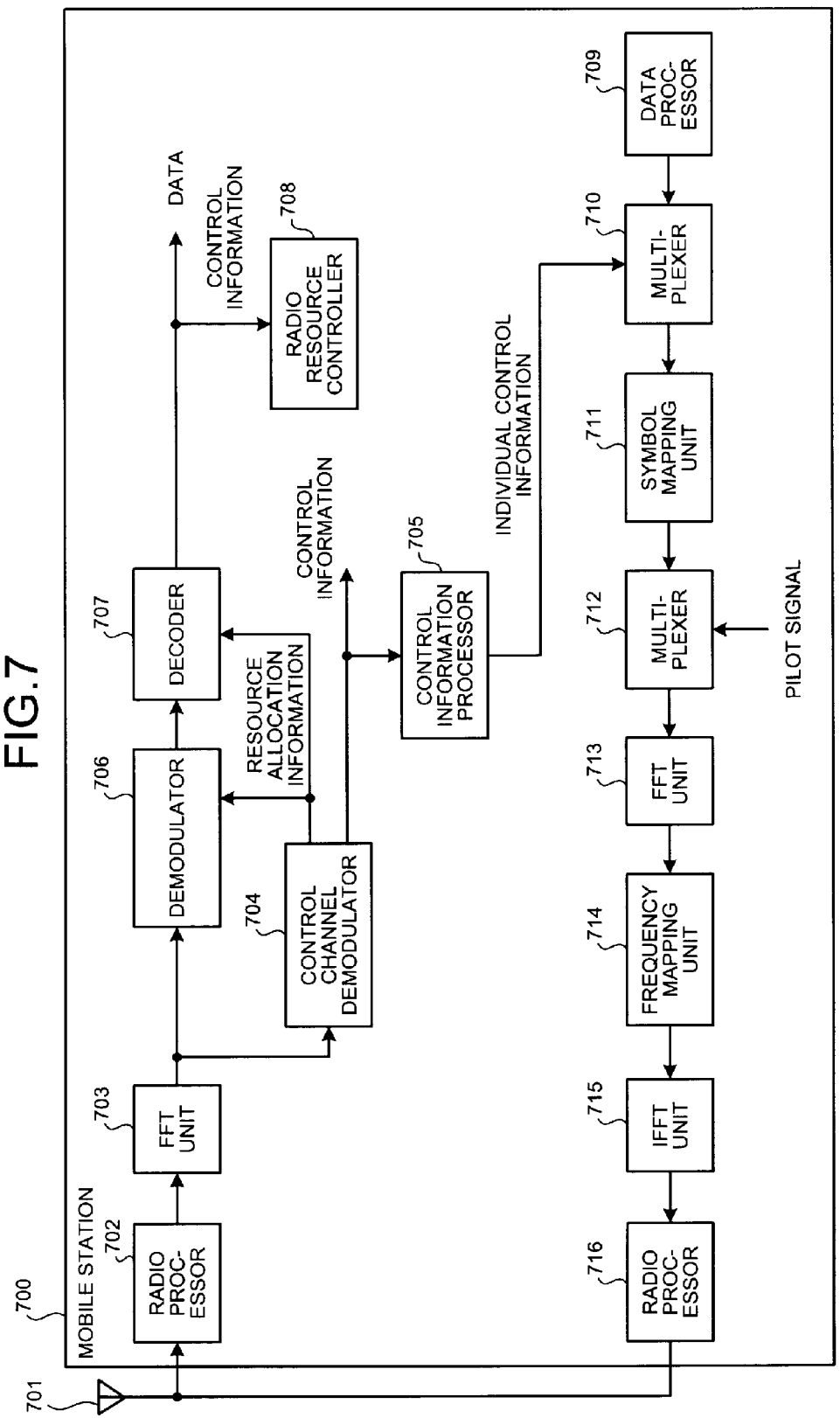
FIG. 7 is a diagram of an example of a configuration of a mobile station.

FIG. 7 is a diagram of an example of a configuration of a mobile station. A mobile station 700 depicted in FIG. 7 is a mobile station that is applied to, for example, the mobile station 131 depicted in FIG. 1. The mobile station 700 includes a transceiving antenna 701, a radio processor 702, an FFT unit 703, a control channel demodulator 704, a control information processor 705, a demodulator 706, a decoder 707, a radio resource controller 708, a data processor 709, a multiplexer 710, a symbol mapping unit 711, a multiplexer 712, an FFT unit 713, a frequency mapping unit 714, an IFFT unit 715, and a radio processor 716.

The transceiving antenna 701 receives, for example, a signal transmitted by radio from the base station 110 and outputs the received signal to the radio processor 702. The radio processor 702 executes radio processing for the signal output from the transceiving antenna 701 and outputs the radio-processed signal to the FFT unit 703. The FFT unit 703 Fourier-transforms the signal output from the radio processor 702 and outputs the Fourier-transformed signal to the control channel demodulator 704 and the demodulator 706.

The control channel demodulator 704 demodulates the control channel included in the signal output from the FFT unit 703, outputs to the demodulator 706 and the decoder 707, resource allocation information acquired by the demodulation of the control channel and outputs control information acquired by the demodulation of the control channel.

The control information processor 705 generates based on the control signal output from the control channel demodulator 704, individual control information to execute transmission from the mobile station 700 to the base station 110 and outputs the generated individual control information to the multiplexer 710.

The demodulator 706 demodulates the signal output from the FFT unit 703, based on the resource allocating information output from the control channel demodulator 704, and outputs the demodulated signal to the decoder 707. The decoder 707 decodes the signal output from the demodulator 706, based on the resource allocation information output from the control channel demodulator 704. The decoding by the decoder 707 includes an error correction process. The decoder 707 outputs the decoded data. The radio resource controller 708 controls the radio resource based on the control information such as CSI measurement instruction included in the data output from the decoder 707.

The data processor 709 generates data to be transmitted to the base station 110 and outputs the generated data to the multiplexer 710. The multiplexer 710 multiplexes the individual control information output from the control information processor 705 and the data output from the data processor 709, and outputs the multiplexed signal to the symbol mapping unit 711. The symbol mapping unit 711 executes symbol-mapping for the signal output from the multiplexer 710 and outputs the symbol-mapped signal to the multiplexer 712.

The multiplexer 712 multiplexes the signal output from the symbol mapping unit 711 and the pilot signal, and outputs the multiplexed signal to the FFT unit 713. The FFT unit 713 Fourier-transforms the signal output from the multiplexer 712 and outputs the Fourier-transformed signal to the frequency mapping unit 714.

The frequency mapping unit 714 executes frequency-mapping for the signal output from the FFT unit 713 and outputs the frequency-mapped signal to the IFFT unit 715. The IFFT unit 715 inverse-Fourier-transforms the signal output from the frequency mapping unit 714 and outputs the inverse-Fourier-transformed signal to the radio processor 716. The radio processor 716 executes radio processing for the signal output from the IFFT unit 715 and outputs the radio-processed signal to the transceiving antenna 701. The transceiving antenna 701 transmits by radio to the base station 110, the signal output from the radio processor 716.

In this manner, the mobile station 700 receives the signal transmitted by the base station 110 and regenerates the data signal using the error correction based on the received signal. Thereby, the mobile station 700 is able to regenerate the data signal even when a portion of the data signals is culled by the base station 110. Therefore, the throughput in the pico cell 121 is able to be improved by the culling of the data signals of the macro cell 111 and the deterioration of the throughput in the macro cell 111 due to the culling of the data signals of the macro cell 111 is able to be suppressed.

As described, according to the base station 110 according to the first embodiment, the control signals and the data signals are time-division-multiplexed such that the time period to allocate the control signals is partially shifted with respect to that of the neighboring cell; and the data signals can be transmitted whose portion overlapping with the control signals of the neighboring cell is culled. Thereby, the interference to the control signals of the neighboring cell is able to be reduced and the throughput is able to be improved.

An example of configuration of a communication system according to a second embodiment is same as that of the communication system 100 depicted in FIG. 1.

Figure 8:
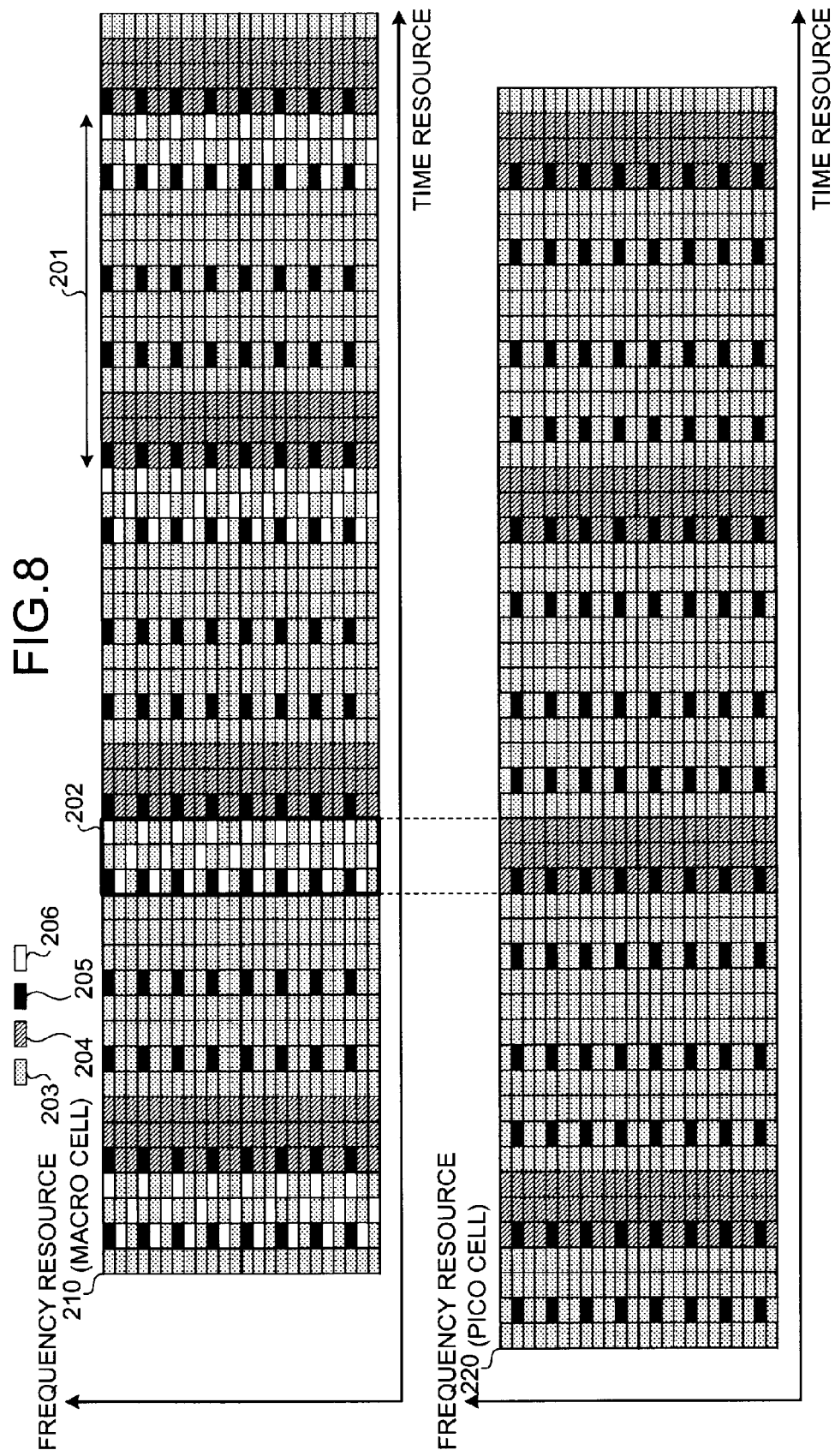
FIG. 8 is a diagram of an example of a transmission signal system according to a second embodiment.

FIG. 8 is a diagram of an example of a transmission signal system according to the second embodiment. In FIG. 8, components identical to those depicted in FIG. 2 are given the same reference numerals used in FIG. 2 and will not again be described. The base station 110 shifts the transmission timing by an amount corresponding to three symbols with respect to the transmission signal system of the base station 120 as depicted for the transmission signal systems 210 and 220. Consequently, the control signals of the transmission signal systems 210 and 220 do not overlap with each other.

In this manner, the base station 110 time-division-multiplexes the control signals and the data signals such that the time period to which the control signals are allocated does not overlap with that of the neighboring cell (the pico cell 121). Therefore, the resource element group 202 temporally overlapping the control signals of the transmission signal system 220 does not include any control signal. The transmission power P of the resource element group 202 in this case is able to be expressed using, for example, equation (3) below.

$$P = P0 \cdot N0 + \sum_{k=1}^{K} Pdk \cdot Ndk \tag{3}$$

Therefore, the transmission power of the resource element group 202 after the culling can be expressed using equation (4) below.

$$P = P0 \cdot N0 + \sum_{k=1}^{K} Pdk(Ndk - Npck) \tag{4}$$

The culling number calculating unit 509 of the base station 500 calculates the culling number with which the transmission power P of equation (4) is equal to or lower than the threshold value Pth, and culls the data signals in the resource element group 202 for the number corresponding to the calculated culling number. The culling number may be same for all the users or may be determined for each of the users based on the margin for the necessary quality of each user.

An example of configuration of the base station 110 according to the second embodiment is same as that of the base station 500 depicted in FIG. 5. However, the multiplexer 508 of the base station 500 time-division-multiplexes the control signals and the data signals such that the time period to which the control signals are allocated does not overlap with that of the neighboring cell (the pico cell 121). An example of operation of the base station 110 according to the second embodiment is same as the example of operation depicted in FIG. 6. An example of configuration of the mobile station 131 according to the second embodiment is same as that of the mobile station 700 depicted in FIG. 7.

As described, according to the base station 110 according to the second embodiment, the control signals and the data signals can be time-division-multiplexed such that the time period to which the control signals are allocated does not overlap with that of the neighboring cell, and the data signals are able to be transmitted whose portion overlapping with the control signals of the neighboring cell is culled. Thereby, the interference to the control signals of the neighboring cell can be reduced and the throughput is able to be improved.

An example of configuration of a communication system according to a third embodiment is same as that of the communication system 100 depicted in FIG. 1.

Figure 9:
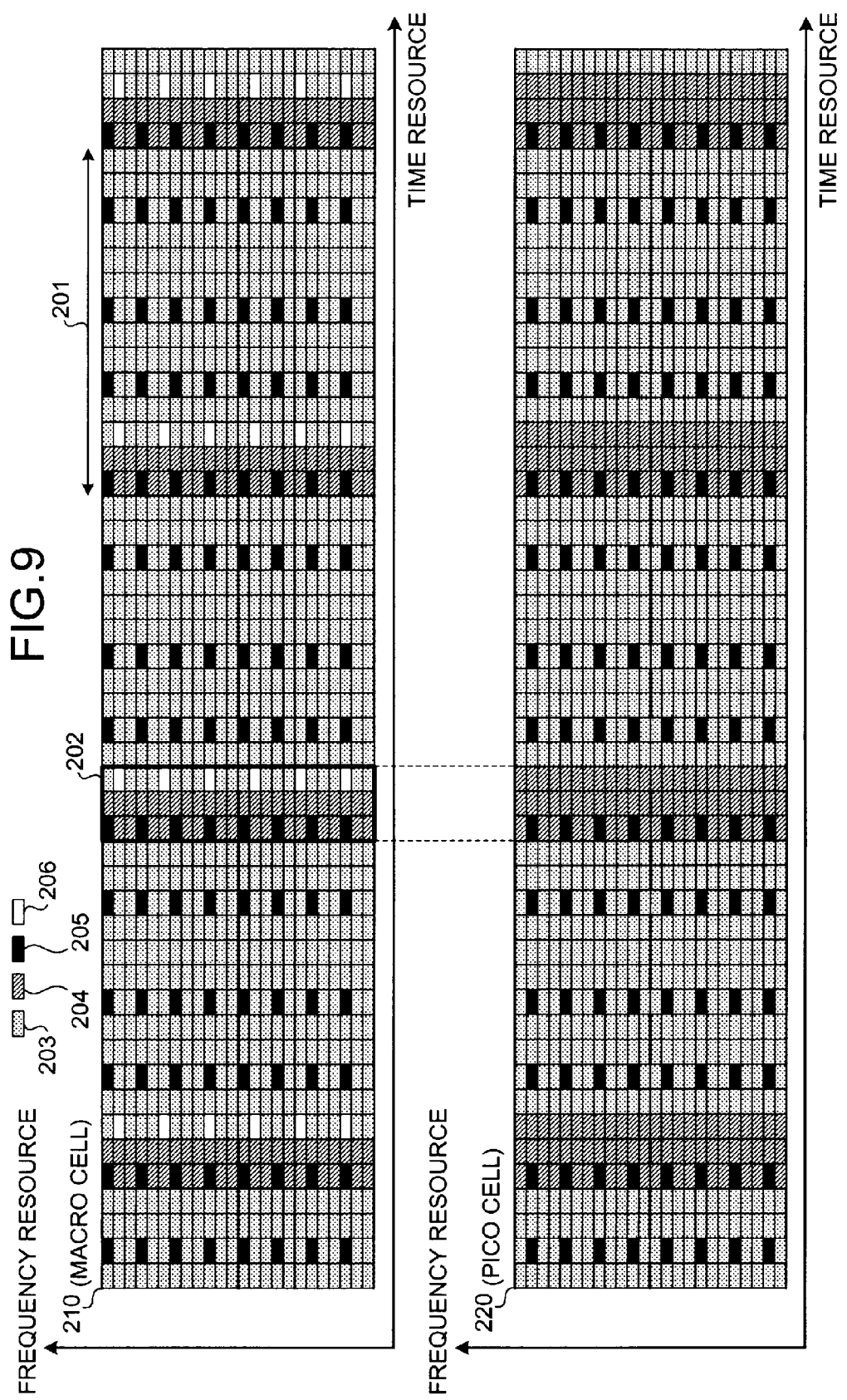
FIG. 9 is a diagram of an example of a transmission signal system according to a third embodiment.

FIG. 9 is a diagram of an example of a transmission signal system according to the third embodiment. In FIG. 9, components identical to those depicted in FIG. 2 are given the same reference numerals used in FIG. 2 and will not again be described. The base station 110 allocates the data signals to a time period that corresponds to 12 symbols in the sub frame and allocates the control signals to a time period that corresponds to two symbols in the sub frame, as depicted for the transmission signal system 210. The base station 120 allocates the data signals to a time period that corresponds to 11 symbols in the sub frame and allocates the control signals to a time period that corresponds to three symbols in the sub frame, as depicted for the transmission signal system 220. In this manner, the base station 110 time-division-multiplexes the control signals and the data signals such that the time period to which the control signals are allocated is shorter than that of the neighboring cell (the pico cell 121).

The base station 110 does not have to shift the transmission timing with respect to the transmission signal system of the base station 120 as depicted for transmission signal systems 210 and 220. In the embodiment, the base station 110 causes the transmission timing to coincide with that of the transmission signal system of the base station 120. Consequently, the control signals of the macro cell 111 and the control signals of the pico cell 121 overlap for an amount corresponding to two symbols.

The transmission power P of the resource element group 202 temporally overlapping with the control signals of the transmission signal system 220 can be expressed using equation (1). The base station 110 culls a portion of the data signals in the resource element group 202. Thus, the transmission power of the resource element group 202 after the culling is able to be expressed using equation (2).

The base station 110 calculates the culling number with which the transmission power P of equation (2) is equal to or lower than the threshold value Pth, and culls the data signals in the resource element group 202 for the number corresponding to the calculated culling number. The culling number may be same for all the users or may be determined for each of the users based on the margin for the necessary quality of the user.

The example of configuration of the base station 110 according to the third embodiment is same as that of the base station 500. However, the multiplexer 508 of the base station 500 time-division-multiplexes the control signals and the data signals such that the time period to which the control signals are allocated is shorter than that of the neighboring cell (the pico cell 121). An example of operation of the base station 110 according to the third embodiment is same as the example of operation depicted in FIG. 6. The example of configuration of the mobile station 131 according to the third embodiment is same as that of the mobile station 700 depicted in FIG. 7.

In this manner, according to the base station 110 according to the third embodiment, the control signals and the data signals can be time-division-multiplexed such that the time period to which the control signals are allocated is shorter than that of the neighboring cell, and the data signals are able to be transmitted whose portion overlapping with the control signals of the neighboring cell is culled. Consequently, the interference to the control signals of the neighboring cell can be reduced and the throughput can be improved.

In a fourth embodiment, control will be described to reduce the interference by increasing the culling number of the data signals (hereinafter, "muting") when the interference is heavy from the macro cell 111 to the pico cell 121 and the communication quality in the pico cell 121 deteriorates. An example of configuration of the communication system according to the fourth embodiment is same as that of the communication system 100 depicted in FIG. 1.

Figure 10:
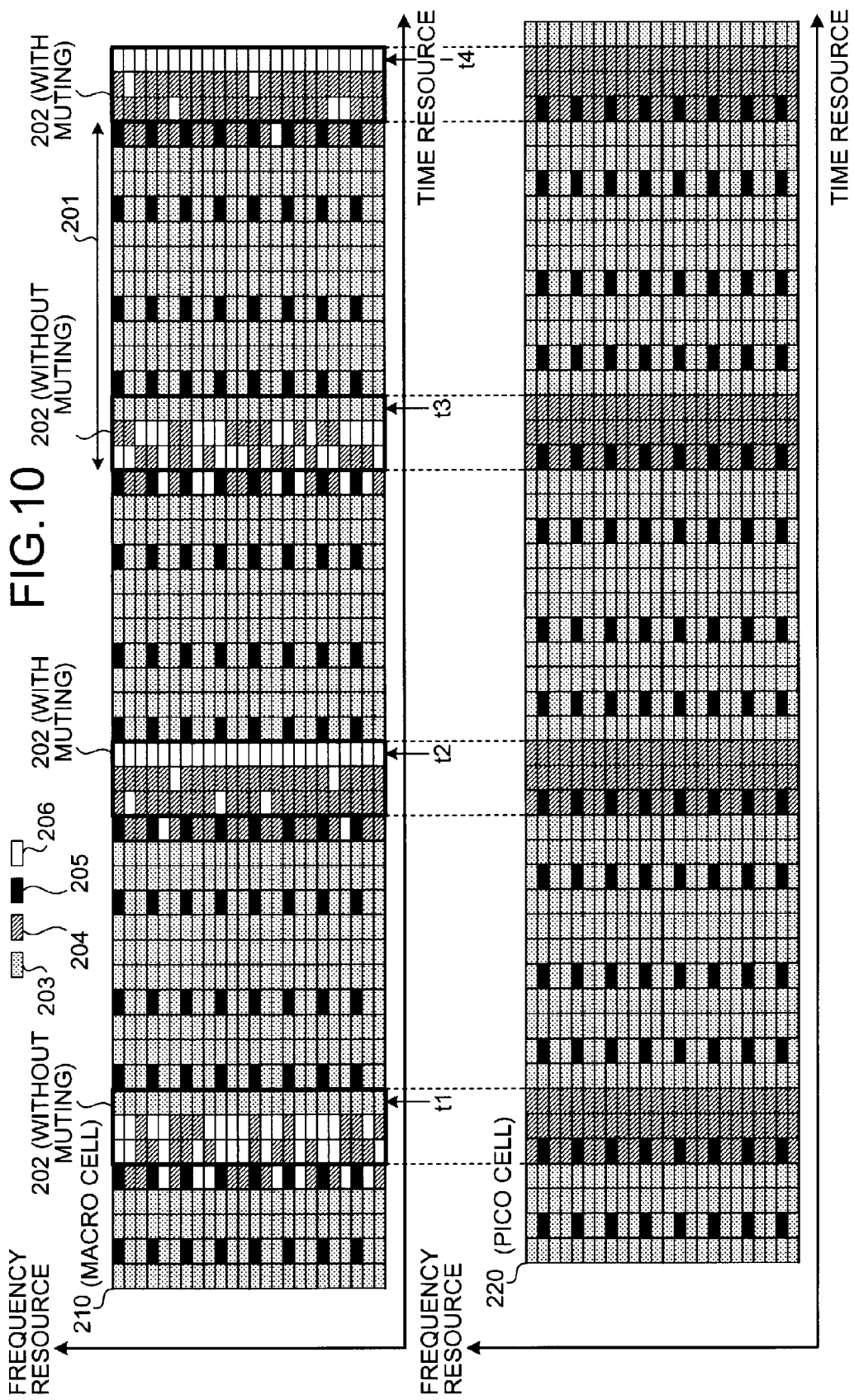
FIG. 10 is a diagram of an example of a transmission signal system according to a fourth embodiment.

FIG. 10 is a diagram of an example of a transmission signal system according to the fourth embodiment. In FIG. 10, components identical to those depicted in FIG. 2 are given the same reference numerals used in FIG. 2 and will not again be described. The macro cell 111 and the pico cell 121 allocates the control signals to the time period corresponding to three symbols in the sub frame (a control signal multiplex section) as depicted for the transmission signal systems 210 and 220 of FIG. 10. The resource element group 202 depicted in FIG. 10 represents a portion that temporally overlaps with the control signals of the transmission signal system 220 in each of the resource elements of the transmission signal system 210 (the control signal multiplex section). The base station 110 shifts the transmission timing of the transmission signal system 210 by an amount corresponding to one symbol with respect to the transmission signal system 220 of the base station 120. Thereby, the control signals of the transmission signal system 210 and the control signals of the transmission signal system 220 overlap with each other for an amount corresponding to two symbols. In this manner, the base station 110 time-division-multiplexes the control signals and the data signals such that the time period of the resource element group 202 to which the control signals are allocated (the control signal multiplex section) is partially shifted with respect to that of the neighboring cell (the pico cell 121).

The actual utilization rate of the radio resource 300 in the control signal multiplex section is determined based on the number of control channels multiplexed and the length of each of the control channels as depicted in FIGS. 3 and 4. A null signal is allocated to each of the resource elements of the portions to which no data signal and no control signal are allocated within the radio resource 300 (the portions other than the regions 301 and 302), and the transmission power of each of the portions is zero. Therefore, when the utilization rate of the radio resource 300 is low, the total transmission power is low of the control signal multiplex section that is the resource element group 202 (see FIG. 3). In the case opposite to the above, the total transmission power of the resource element group 202 is high and therefore, the interference with the other cell (the pico cell 121) is increased (see FIG. 4).

In the fourth embodiment, when the utilization rate of the radio resource 300 is high in the control signal multiplex section, all the data symbols are culled (muted) of a row in the frequency resource direction (24 symbols in the case in FIG. 10) of the interfering cell (the macro cell 111), that overlaps with the control signals of the cell subject to interference (the pico cell 121). In this muting, as described with reference to FIG. 10, all the data signals are set to be null signals (the value of the data is set to be zero) of the frequency resource at the same times (times t2 and t4) as those of one resource element that overlaps with the control signals of the pico cell 121 of the resource element group 202 of the macro cell 111. Each of the above embodiments is configured to execute puncturing to cull the portion of the data signals positioned in the resource element group 202. However, in the fourth embodiment, the configuration to cull all the data signals overlapping with the control signals is described as muting. The transmission power of the resource element muted is zero.

Determination whether the muting is to be applied is controlled such that the sum is equal to or smaller than a predetermined value of the transmission power in the control signal multiplex section of the macro cell 111 and the transmission power of the data signal multiplex section of the macro cell 111 that overlaps with the control signal multiplex section of the pico cell 121. For example, the transmission power P is as expressed in equation (1), of the section overlapping with the control signal multiplex section (the resource element group 202) of the pico cell 121 in the transmission signal of the macro cell 111.

In equation (1), "K" denotes the number of PDSCHs allocated to the resource element group 202 (the number of users). "P0", "P1", "P2", and "P3" respectively are EPRE of each of the reference signal, PCFICH, PHICH, and PDCCH. "Pdk" is EPRE of PDSCH of a user "k".

"N0, "N1", "N2", and "N3" respectively are numbers of resource elements of the reference signal, PCFICH, PHICH, and PDCCH in the resource element group 202. "Ndk" is number of resource elements of PDSCH allocated to the user k in the resource element group 202.

Resource element numbers N0 and N1 respectively of the reference signal and PCFICH are, for example, constant in each sub frame. The resource element numbers N2, N3, and Ndk respectively of PHICH, PDCCH, and PDSCH are, for example, different in each sub frame. Therefore, the transmission power P of the resource element group 202 is different in each sub frame and the power of the interference to the pico cell 121 also varies accordingly.

The base station 110 executes control to mute the symbols of the data signals (PDSCH) of the macro cell 111 that temporally overlaps with the control signal multiplex section of the pico cell 121 such that the transmission power P of the section of the resource element group 202 is equal to or lower than the predetermined threshold value Pth described later. When this muting is executed, section transmission power P' after the muting is expressed in equation (5).

$$P' = P0 \cdot N0 + P1 \cdot N1 + P2 \cdot N2 + P3 \cdot N3 \quad (5)$$

It is determined whether the muting is executed for the PDSCH symbols such that P' and Pth are P'≤Pth. For example, any one among (a) and (b) below is selected.

(a) P≤Pth Without any muting (times t1 and t3) (b) P>Pth and P'≤Pth The muting applied (times t2 and t4) (c) P'>Pth The muting applied+schedule limited "(c)" is a process executed when the section transmission power P' after the muting is not equal to or lower than the threshold value Pth even with the muting according to (b) applied thereto. In this case, the control is executed for the section transmission power P' to be equal to or lower than the threshold value Pth by concurrently using a process of reducing the utilization rate of the radio resource of PDCCH by changing (limiting) the scheduling by the MAC scheduler 504.

The predetermined threshold value Pth is a value that is determined based on the magnitude of the influence of the interference on the cell subject to interference (the pico cell 121). For example, the level of the interference is measured by the mobile station 132 in the cell subject to interference (the pico cell 121). The cell subject to interference or the interfering cell acquires the threshold value Pth based on the level of the interference reported from the mobile station 132, and finally uses the threshold value Pth acquired as the threshold value Pth of the base station 110 of the interfering cell (the macro cell 111).

Figure 11:
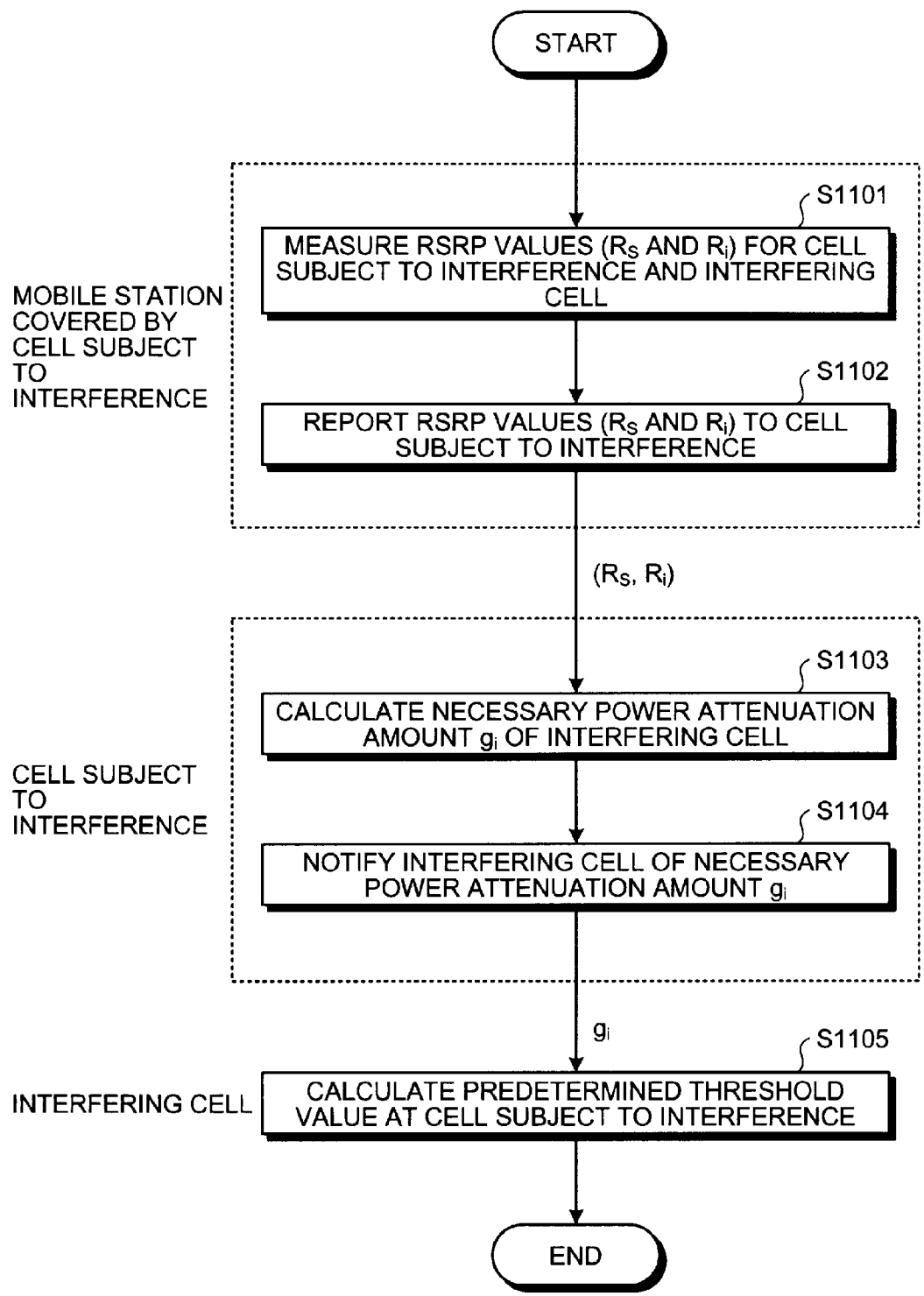
FIG. 11 is a flowchart of the content of a process of calculating a threshold value to be used in applying muting.

FIG. 11 is a flowchart of the content of the process of calculating the threshold value to be used in applying the muting. FIG. 11 depicts an example where the threshold value is calculated by the cell subject to interference (the pico cell 121). According to a process executed by the mobile station 132 covered by the cell subject to interference (the pico cell 121), reception power reference signal received power (RSRP) value (Rs) of the reference signal in the cell subject to interference (the pico cell 121) and the RSRP value (Ri) of the interfering cell (the macro cell 111) are measured (step S1101) and these RSRP values (Rs and Ri) are reported to the cell subject to interference (the pico cell 121) (step S1102).

The base station 120 of the cell subject to interference (the pico cell 121) executes a process of calculating a necessary power attenuation amount gi of the interfering cell (the macro cell 111) expressed in equation (6) below using the RSRP values (Rs and Ri) reported from the mobile station 132 (step S1103).

$$gi = Rs/(\gamma \cdot Ri) \quad (6)$$

("γ" is the necessary SINR in the control channel.)

The base station 120 in the cell subject to interference (the pico cell 121) notifies the base station 110 in the interfering cell (the macro cell 111) of the necessary power attenuation amount gi (step S1104).

The base station in the interfering cell (the macro cell 111) acquires the predetermined threshold value Pth using gi notified of from the base station of the cell subject to interference (the pico cell 121) by calculation using equation (7) below (step S1105).

$$Pth = gi \cdot Pi \quad (7)$$

("Pi" is the control channel transmission power of the macro cell 111.)

The content may also be configured to execute the processes executed by the cell subject to interference (the pico cell 121) (steps S1103 and S1104) using the interfering cell (the macro cell 111) as a variation of the content of the process. In this case, the process of step S1102 only has to be configured to notify the macro cell 111 of the RSRP value (Rs and Ri) from the pico cell 121.

A response to variation of the encoding rate occurring when the muting is applied will be described. As described above, when the muting is executed for the symbols of the data signal (PDSCH), the culling number becomes larger than the number of elements culled by the puncturing and therefore, the encoding rate is substantially increased and, in response to this, a problem arises in that weakness is generated with respect to an error. Therefore, a configuration can be considered to prevent deterioration of the data by setting the encoding rate to be low in advance to compensate the data for deterioration (an increase of the error rate) caused by executing the muting.

Figure 12:
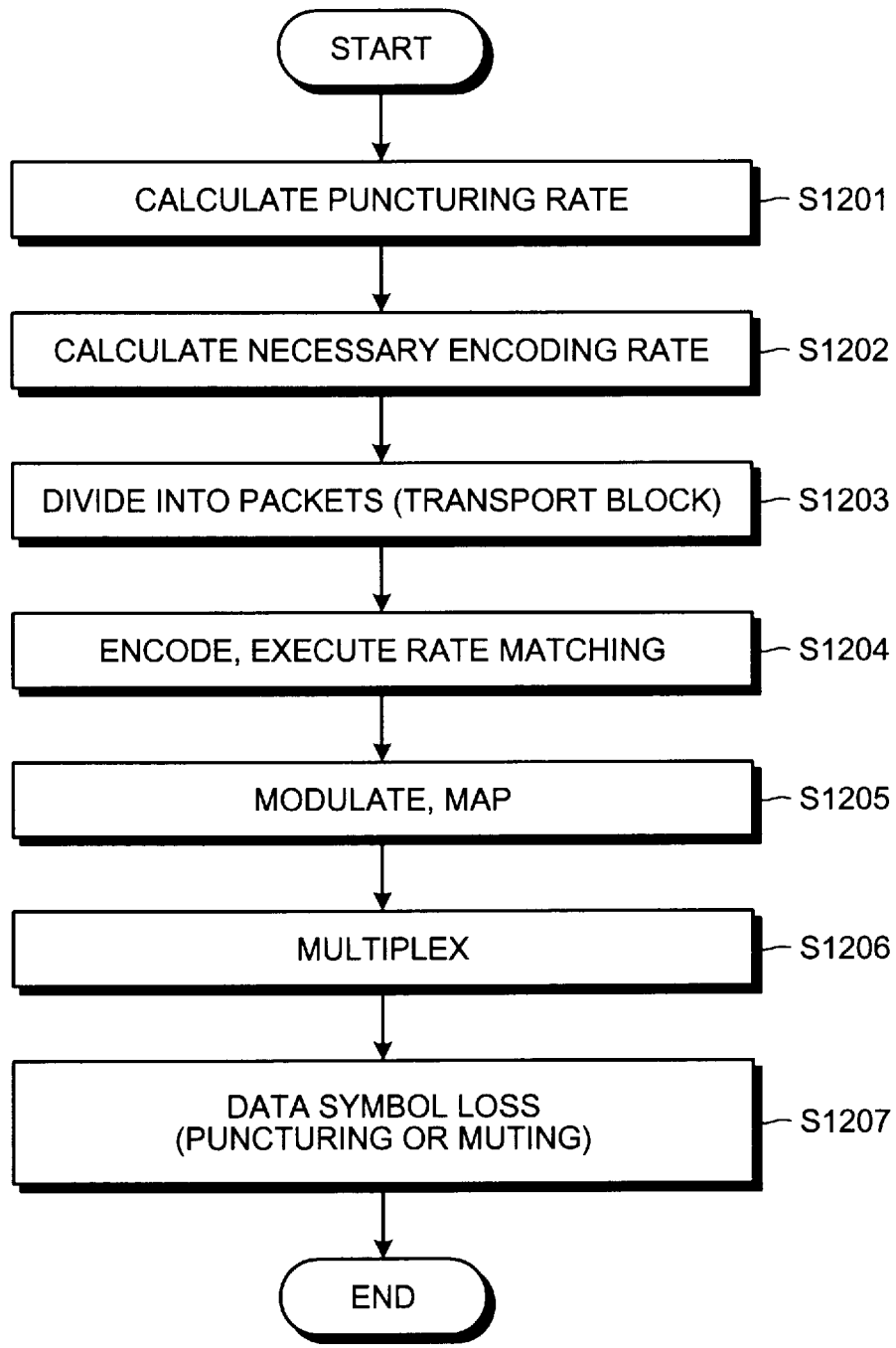
FIG. 12 is a flowchart of a process executed for loss of data signals using control of an encoding rate.

FIG. 12 is a flowchart of a process executed for loss of the data signals using control of the encoding rate. The description will be made with reference to FIG. 12 taking an example of the case where a portion of the data signals is culled by the puncturing. When a predetermined puncturing rate is employed, that is, when the number of symbols of the data signals culled by the puncturing is a predetermined number, the number of symbols is equal to the number of data signals culled by the muting. From the viewpoint of losing the data signals, the culling and the muting are a same process.

The base station 110 of the interfering cell (the macro cell 111) first calculates the puncturing rate based on the number of data signals culled (step S1201), and calculates the necessary encoding rate based on the number of data signals (the number of symbols) lost during the time period corresponding to one symbol (step S1202). In this case, the encoding rate is set to be low in response to the puncturing rate that is high (and when the muting is executed).

Packets are generated for the data signal input. In this case, the data signals are divided into blocks each having a predetermined transport block size (packet division) (step S1203). After the packets are encoded at the encoding rate, rate matching is executed (step S1204). Thereafter, the packets are modulated in a predetermined modulation scheme and are mapped according to the modulation (step S1205). The packets after the modulation are multiplexed with the control signals such as the pilot signal (reference signal), annunciation information, and individual control information based on the scheduling (step S1206). Thereafter, the predetermined number of symbols of the data signals of the resource element group 202 are lost (the puncturing or the muting) (step S1207) and the packets are transmitted to the mobile station 131 by radio.

Figure 13:
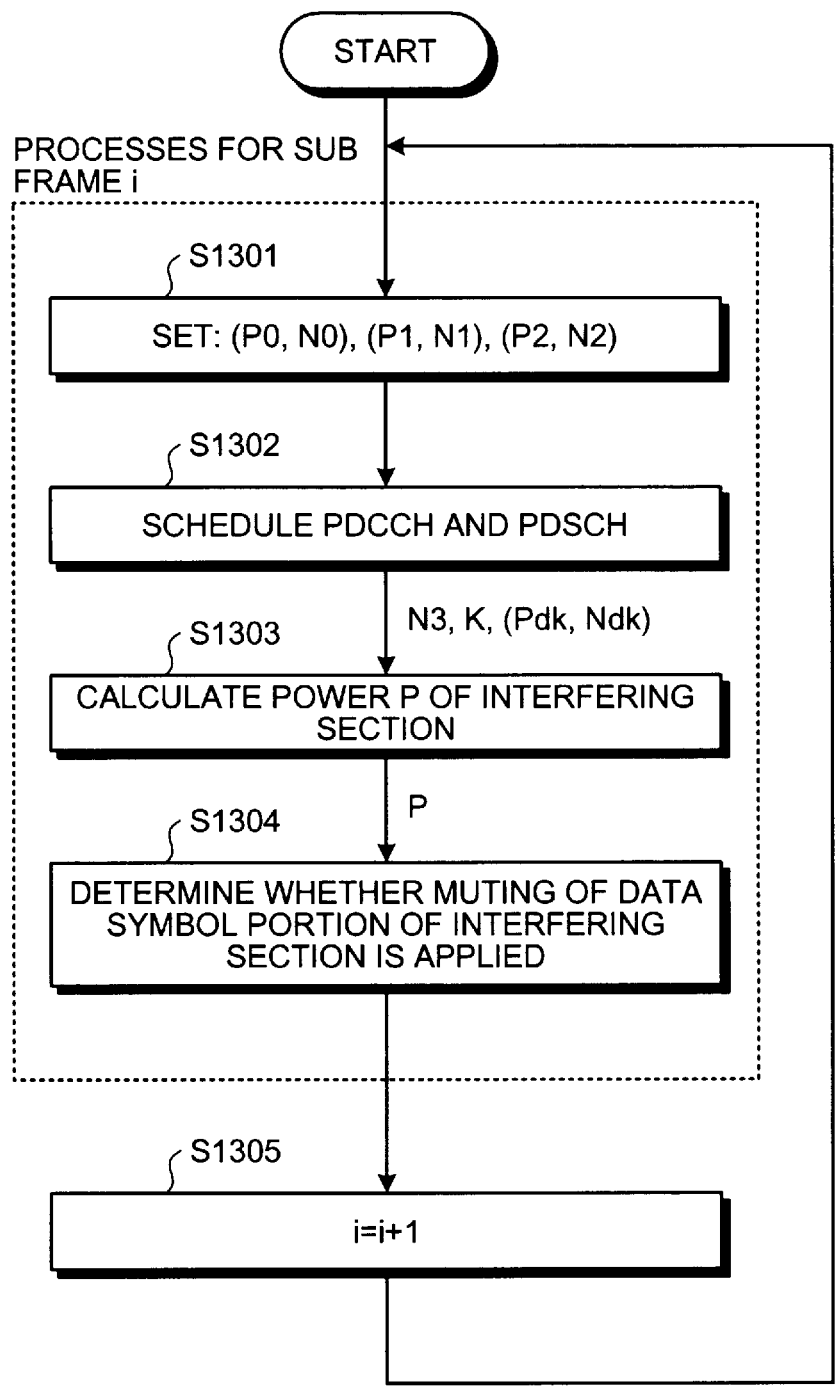
FIG. 13 is a flowchart of an example of operation of the base station according to the fourth embodiment.

FIG. 13 is a flowchart of an example of operation of the base station according to the fourth embodiment. FIG. 13 depicts processes of scheduling for each sub frame and losing the data symbols executed by the base station 110. For the sub frame i, P0, P1, and P2 are set that denote EPREs respectively of the reference signal, PCFICH, and PHICH that each are the transmission power of each resource element, and N0, N1, and N2 are set that denote the numbers of resource elements respectively of the reference signal, PCFICH, and PHICH of the resource element group 202 (step S1301). For the sub frame i, scheduling is executed for PDCCH and PDSCH (step S1302). In this case, as depicted in FIG. 10, PDCCH and PDSCH are allocated such that a time period to which PDCCH is allocated is partially shifted with respect to that of the neighboring cell (the pico cell 121). By this allocation, N3, K, Pdk, and Ndk are acquired for the sub frame i.

The power P of the interfering section is calculated (step S1303). The transmission power P of the section overlapping with the control signal multiplex section of the pico cell 121 (the resource element group 202) is calculated using equation (1).

Process of losing data is executed for the data symbols of the interfering section. In the embodiment, it is determined whether the muting is applied (step S1304). In this case, the section transmission power P' after the muting is applied is calculated using equation (5) and thereafter, it is determined using the threshold value Pth whether the muting is to be applied.

Thereby, a signal is transmitted that indicates execution of the determination as to whether the muting is to be applied to the data signals and the series of processes for the sub frame i comes to an end. The procedure transitions to the processes for the sub frame next to the sub frame i (i=i+1) (step S1305) and the procedure transitions to step S1301.

Figure 14:
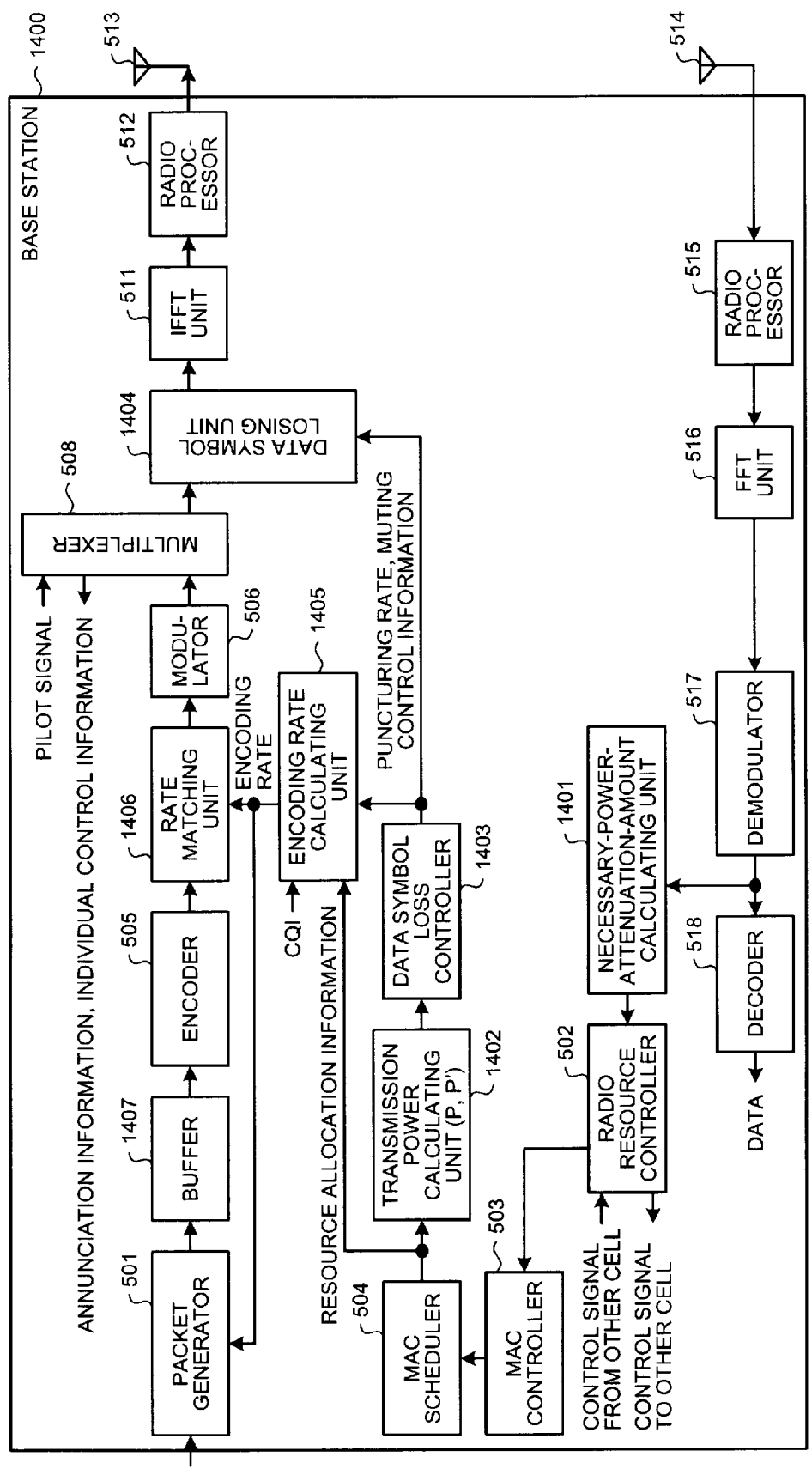
FIG. 14 is a diagram of an example of configuration of a base station according to a fourth embodiment.

FIG. 14 is a diagram of an example of configuration of a base station according to the fourth embodiment. In FIG. 14, components identical to those depicted in FIG. 5 are given the same reference numerals used in FIG. 5. The base station 1400 has a configuration added thereto to receive the reception power RSRP values (Rs and Ri) depicted in FIG. 11 and received from the mobile station 132 covered by the cell subject to interference (the pico cell 121), and further has configurations added thereto to calculate the necessary power attenuation amount gi based on the RSRP values received, to calculate the threshold value based on the necessary power attenuation amount gi, and to determine whether the muting is to be applied based on the threshold value and apply the muting to the data symbols.

Assuming that the base station 1400 described with reference to FIG. 14 is a base station of the interfering cell (the macro cell 111), the base station 1400 of the macro cell 111 executes the process for the calculation of the necessary power attenuation amount gi executed by the cell subject to interference (the pico cell 121) depicted in FIG. 11.

A necessary-power-attenuation-amount calculating unit 1401 calculates the necessary power attenuation amount gi based on the reported values of the RSRP values (Rs and Ri) from the mobile station 132 included in the received data after being decoded by the decoder 518.

The calculating unit 1402 calculates the transmission power P of the section overlapping with the control signal multiplex section of the pico cell 121 (the resource element group 202), and the section transmission power P' after the muting.

A data symbol loss controller 1403 acquires the threshold value Pth based on the necessary power attenuation amount gi, and determines whether the muting is to be applied, by comparing the kinds of transmission power P and P' with the threshold value Pth. In this case, the data symbol loss controller 1403 outputs to a data symbol losing unit 1404 the puncturing rate depicted in FIG. 12 and the control information as to whether the muting is to be executed.

Thereby, for each data symbol, whether the muting is supplied is controlled corresponding to the threshold value and, as depicted in FIG. 10, when the utilization rate of the radio resource 300 is high in the control signal multiplex section, all the data symbols are muted of one row in the frequency resource axis direction of the interfering cell (the macro cell 111) that overlaps with the control signals of the cell subject to interference (the pico cell 121) (at the times t2 and t4).

In addition to the muting configuration, an encoding rate calculating unit 1405 may be included as a configuration to properly control the encoding rate when the muting is executed. The encoding rate calculating unit 1405 is input with resource allocation information for the scheduling by the MAC scheduler 504, the range of the CQI value concerning the transmission data set in advance (the margin for the necessary quality), the puncturing rate calculated by the data symbol loss controller 1403, and the control information as to whether the muting is applied, and the encoding rate calculating unit 1405 calculates the encoding rate within the margin for the necessary quality based on these input values (corresponding to step S1202).

The packet generator 501 and a rate matching unit 1406 execute processes of production and rate matching of the packets based on the encoding rate calculated and thereby, generate the sub frame having the encoding rate. "1407" denotes a buffer that temporarily stores the packets generated by the packet generator 501.

When the muting is to be applied, the encoding rate calculating unit 1405 sets the encoding rate to be low in advance to compensate the data deterioration (an increase of the error rate). According to the above configuration, the data deterioration occurring when the muting is applied is also prevented.

Figure 15:
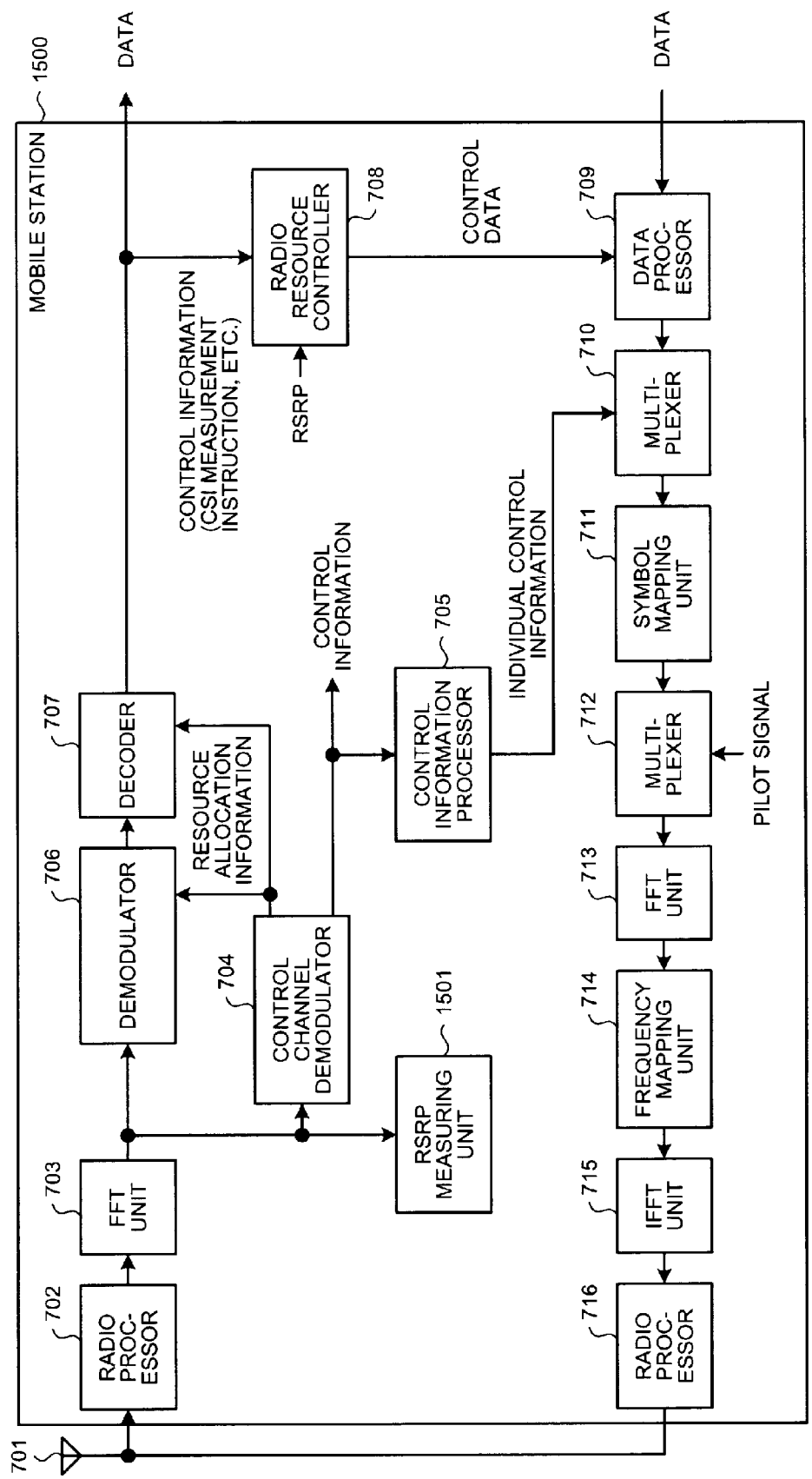
FIG. 15 is a diagram of an example of configuration of a mobile station according to the fourth embodiment.

FIG. 15 is a diagram of an example of configuration of a mobile station according to the fourth embodiment. In FIG. 15, a portion different from that in FIG. 7 is a configuration that has an RSRP measuring unit 1501 included therein to measure the RSRP values (Rs and Ri) in the cell to which the mobile station belongs and that multiplexes the RSRP values (Rs and Ri) measured as the control data through the radio resource controller 708 and thereby, transmits the control data to the base station 1400.

In this manner, according to the fourth embodiment, when the interference from the macro cell 111 to the pico cell 121 is high, the data signals overlapping with the control signals of the neighboring cell can be transmitted after being muted.

Thereby, the interference to the control signal of the neighboring cell can be reduced and the throughput can be improved. The data deterioration (an increase of the error rate) can be compensated by varying the encoding rate at a timing matched with the timing of executing the muting.

Although description has been made taking the configuration to execute the muting as the specific example of the loss of the data symbols in the description of the base station 1400 of FIG. 14, configuration is not limited hereto and the configuration depicted in FIG. 14 is applicable to the puncturing in each of the first to the third embodiments and, when the number of symbols (in the case of FIG. 10, the number of symbols that is 24 culled by the puncturing) each of whose data signal is lost during the puncturing by the data symbol loss controller 1403 and the data symbol losing unit 1404 corresponds to the muting number, and similarly for executing the muting.

FIG. 16 is a diagram of an example of a transmission signal system according to a fifth embodiment. As depicted for the transmission signal system 210, the base station 110 allocates the data signals to the time period corresponding to 12 symbols in the sub frame and allocates the control signals to the time period corresponding to two symbols in the sub frame. As depicted for the transmission signal system 220, the base station 120 allocates the data signals to the time period corresponding to 11 symbols in the sub frame and allocates the control signals to the time period corresponding to three symbols in the sub frame. In this manner, the base station 110 time-division-multiplexes the control signals and the data signals such that the time period to which the control signals are allocated is shorter than that of the neighboring cell (the pico cell 121).

As depicted for the transmission signal systems 210 and 220, the base station 110 does not have to shift the transmission timing with respect to the transmission signal system 220 of the base station 120. In this case, the base station 110 matches its transmission timing with that of the transmission signal system 220 of the base station 120. Thereby, the control signals of the macro cell 111 and the control signals of the pico cell 121 overlap with each other for an amount corresponding to two symbols.

The transmission power P of the resource element group 202 temporally overlapping the control signals of the transmission signal system 220 can be expressed using equation (1). Similar to the fourth embodiment, the section transmission power P' after the muting can be expressed using equation (5).

Similar to the fourth embodiment, the base station 110 determines whether the muting is to be applied, by comparing the transmission power P and the section transmission power P' with the threshold value Pth. This muting may be same for all the users or may be determined for each of the users based on the margin for the necessary quality of the user.

An example of configuration of the base station 110 according to the fifth embodiment is same as that of the base station 1400 depicted in FIG. 14. However, the multiplexer 508 of the base station 1400 time-division-multiplexes the control signals and the data signals such that the time period to which the control signals are allocated is shorter than that of the neighboring cell (the pico cell 121). An example of configuration of the mobile station 131 according to the fifth embodiment is same as that of a mobile station 1500 depicted in FIG. 15.

As described, according to the base station 110 according to the fifth embodiment, the control signals and the data signals are time-division-multiplexed such that the time period to which the control signals are allocated is shorter than that of the neighboring cell, and the data signals overlapping the control signals of the neighboring cell can be transmitted after being muted. Thereby, the interference to the control signals of the neighboring cell can be reduced and the throughput can be improved.

According to the fifth embodiment, similar to the fourth embodiment, whether the muting is applied to the data symbols is controlled and thereby, the sum of the transmission power in the control signal multiplex section of the interfering cell (the macro cell 111) and the transmission power of the data signal multiplex section of the interfering cell overlapping the control signal multiplex section of the cell subject to interference (the pico cell 121), is set to be equal to or lower than the predetermined value. According to the fifth embodiment, an advantage is achieved in that sub frame transmission timing does not need to be shifted among the cells.

As described, according to the base station, the communication system, the mobile station, and the communication method, the throughput is able to be improved.

According to the base station, the communication system, the mobile station, and the communication method disclosed herein, an effect is achieved that the throughput can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
a time-division-multiplexer that time-division-multiplexes control signals and data signals;
a processor that culls from a time-division-multiplexed signal generated by the time-division-multiplexer, data signals temporally overlapping control signals of a neighboring cell;
a transmitter that transmits the time-division-multiplexed signal from which the data signals are culled by the processor; and
a signal processor that determines conditions concerning the culling corresponding to transmission power of a portion temporally overlapping the control signals of the neighboring cell, in the time-division-multiplexed signal transmitted by the transmitter, wherein
the processor culls the data signals based on a result obtained by the signal processor.

2. The base station according to claim 1, wherein
the signal processor determines whether culling is to be executed and a culling number such that transmission power of the portion in the signal transmitted by the transmitter and temporally overlapping the control signals of the neighboring cell is equal to or lower than a threshold value.

3. The base station according to claim 1, wherein
the time-division-multiplexer time-division-multiplexes the control signals and the data signals such that a time period to which the control signals are allocated is partially shifted with respect to that of the neighboring cell, and the processor culls from the time-division-multiplexed signal generated by the time-division-multiplexer, a portion of the data signals temporally overlapping the control signals of the neighboring cell.

4. The base station according to claim 1, wherein
the time-division-multiplexer time-division-multiplexes the control signals and the data signals such that a time period to which the control signals are allocated does not overlap that of the neighboring cell, and
the processor culls from the time-division-multiplexed signal generated by the time-division-multiplexer, a portion of the data signals temporally overlapping the control signals of the neighboring cell.

5. The base station according to claim 1, wherein
the time-division-multiplexer time-division-multiplexes the control signals and the data signals such that a time period to which the control signals are allocated is shorter than that of the neighboring cell, and
the processor culls from the time-division-multiplexed signal generated by the time-division-multiplexer, a portion or an entirety of the data signals temporally overlapping the control signals of the neighboring cell.

6. The base station according to claim 1, wherein
the time-division-multiplexer time-division-multiplexes the control signals and the data signals such that a time period to which the control signals are allocated is partially shifted with respect to that of the neighboring cell, and
the processor culls from the time-division-multiplexed signal generated by the time-division-multiplexer, an entirety of the data signals temporally overlapping the control signals of the neighboring cell.

7. The base station according to claim 6, wherein the signal processor is configured to determine whether the data signals are to be culled, by comparing with a threshold value, transmission power of the portion temporally overlapping the control signals of the neighboring cell in the signal transmitted by the transmitter and transmission power of the portion temporally overlapping the control signals after being culled by the processor.

8. The base station according to claim 1, further comprising
a receiver that receives a measurement result of a level of interference from the base station in the neighboring cell, wherein
the signal processor determines a threshold value based on the measurement result received by the receiver.

9. The base station according to claim 6, further comprising
an encoder that varies an encoding rate of the data signals when transmission power of the portion temporally overlapping the control signals after being culled by the processor is not equal to or lower than a threshold value even in a case where the processor culls from the time-division-multiplexed signal generated by the time-division-multiplexer, the entirety of the data signals temporally overlapping the control signals of the neighboring cell.

10. A communication system comprising:
a base station comprising:
a time-division-multiplexer that time-division-multiplexes control signals and data signals;
a processor that culls from a time-division-multiplexed signal generated by the time-division-multiplexer, data signals temporally overlapping control signals of a neighboring cell;
a transmitter that transmits the time-division-multiplexed signal from which the data signals are culled by the processor; and a signal processor that determines conditions concerning the culling, corresponding to transmission power of a portion temporally overlapping the control signals of the neighboring cell in the time-division-multiplexed signal transmitted by the transmitter, wherein the processor culls the data signals based on a result obtained by the signal processor; and a mobile station that receives a signal transmitted by the base station, the mobile station reproducing the data signal using error correction based on the received signal.

11. The communication system according to claim 10, wherein the signal processor determines whether culling is to be executed and a culling number such that transmission power of the portion temporally overlapping the control signals of the neighboring cell in the signal transmitted by the transmitter is equal to or lower than a threshold value.

12. The communication system according to claim 10, wherein the time-division-multiplexer of the base station time-division-multiplexes the control signals and the data signals such that a time period to which the control signals are allocated is partially shifted with respect to that of the neighboring cell, and the processor culls from the time-division-multiplexed signal generated by the time-division-multiplexer, a portion of the data signals temporally overlapping the control signals of the neighboring cell.

13. The communication system according to claim 10, wherein the time-division-multiplexer of the base station time-division-multiplexes the control signals and the data signals such that a time period to which the control signals are allocated does not overlap with that of the neighboring cell, and the processor culls from the time-division-multiplexed signal generated by the time-division-multiplexer, a portion of the data signals temporally overlapping the control signals of the neighboring cell.

14. The communication system according to claim 10, wherein the time-division-multiplexer of the base station time-division-multiplexes the control signals and the data signals such that a time period to which the control signals are allocated is shorter than that of the neighboring cell, and the processor culls from the time-division-multiplexed signal generated by the time-division-multiplexer, a portion or whole of the data signals temporally overlapping with the control signals of the neighboring cell.

15. The communication system according to claim 10, wherein the time-division-multiplexer of the base station time-division-multiplexes the control signals and the data signals such that a time period to which the control signals are allocated is partially shifted with respect to that of the neighboring cell, and the processor culls from the time-division-multiplexed signal generated by the time-division-multiplexer, an entirety of the data signals temporally overlapping the control signals of the neighboring cell.

16. A mobile station that receives a signal transmitted from a base station that comprises a time-division-multiplexer that time-division-multiplexes control signals and data signals, a processor that culls data signals temporally overlapping control signals of a neighboring cell from a time-division-multiplexed signal generated by the time-division-multiplexer, a transmitter that transmits the time-division-multiplexed signal from which the data signals are culled by the processor, and a signal processor that determines conditions concerning the culling corresponding to transmission power of a portion temporally overlapping with the control signals of the neighboring cell in the time-division-multiplexed signal transmitted by the transmitter, wherein the processor culls the data signals based on a result by the signal processor, wherein the mobile station regenerates the data signals using error correction based on the received signal.

17. A communication method of a base station that performs radio communication with a mobile station, the communication method comprising:

time-division-multiplexing control signals and data signals;

culling from a time-division-multiplexed signal generated at the time-division-multiplexing, data signals temporally overlapping control signals of a neighboring cell;

transmitting the time-division-multiplexed signal from which the data signals are culled at the culling; and determining conditions concerning the culling corresponding to transmission power of a portion temporally overlapping the control signals of the neighboring cell, in the time-division-multiplexed signal transmitted at the transmitting, wherein the culling includes culling the data signals based on a result obtained at the determining.

18. The communication method according to claim 17, wherein the determining includes determining whether culling is to be executed and a culling number such that transmission power of the portion in the signal transmitted at the transmitting and temporally overlapping the control signals of the neighboring cell is equal to or lower than a threshold value.

19. A base station comprising:

a time-division-multiplexer that time-division-multiplexes control signals and data signals;

a processor that culls from a time-division-multiplexed signal generated by the time-division-multiplexer, data signals temporally overlapping control signals of a neighboring cell;

a transmitter that transmits the time-division-multiplexed signal from which the data signals are culled by the processor; and a signal processor that determines conditions concerning the culling corresponding to transmission power of a portion temporally overlapping the control signals of the neighboring cell, in the time-division-multiplexed signal transmitted by the transmitter, wherein the processor culls the data signals based on a result obtained by the signal processor, and wherein the signal processor determines whether culling is to be executed and a culling number such that transmission power of the portion in the signal transmitted by the transmitter and temporally overlapping the control signals of the neighboring cell is equal to or lower than a threshold value.

* * * * *